US010700815B2

(12) United States Patent
Nan et al.

(10) Patent No.: US 10,700,815 B2
(45) Date of Patent: *Jun. 30, 2020

(54) INFORMATION TRANSMISSION METHOD, BASE STATION, AND USER EQUIPMENT

(71) Applicant: Huawei Technologies Co., Ltd., Shenzhen (CN)

(72) Inventors: Fang Nan, Beijing (CN); Zheng Yu, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 233 days.

This patent is subject to a terminal disclaimer.

(21) Appl. No.: 15/256,151

(22) Filed: Sep. 2, 2016

(65) Prior Publication Data
US 2016/0373215 A1    Dec. 22, 2016

Related U.S. Application Data

(63) Continuation of application No. PCT/CN2014/072807, filed on Mar. 3, 2014.

(51) Int. Cl.
*H04L 1/08*    (2006.01)
*H04W 72/00*    (2009.01)
(Continued)

(52) U.S. Cl.
CPC .............. *H04L 1/08* (2013.01); *H04W 72/00* (2013.01); *H04W 72/042* (2013.01); *H04W 88/02* (2013.01); *H04W 88/08* (2013.01)

(58) Field of Classification Search
CPC .. G05B 15/02; G05F 1/66; H04B 3/54; H04L 12/10; H04L 12/1886; H04L 12/2807;
(Continued)

(56) References Cited

U.S. PATENT DOCUMENTS 7,054,301 B1    5/2006 Sousa et al.
2008/0102846 A1    5/2008 Kim et al.
(Continued)

FOREIGN PATENT DOCUMENTS

CN    101632323 A    1/2010
CN    102474866 A    5/2012
(Continued)

OTHER PUBLICATIONS

"On support of low-cost MTC terminals with reduced Tx/Rx bandwidths," 3GPP TSG-RAN WG1 Meeting #66, Athens, Greece, R1-112669, 3$^{rd}$ Generation Partnership Project, Valbonne, France (Aug. 22-26, 2011).
(Continued)

*Primary Examiner* — Andrew Lai
*Assistant Examiner* — Chuong M Nguyen
(74) *Attorney, Agent, or Firm* — Leydig, Voit & Mayer, Ltd.

(57) ABSTRACT

This application provides an information transmission method, a base station, and user equipment. The method includes: determining a first frequency resource, where the first frequency resource is a frequency resource used to send first information in an enhanced manner; determining a second frequency resource, where the second frequency resource is a frequency resource used to send second information or send second information in an enhanced manner; and when there is an overlapping frequency resource between the first frequency resource and the second frequency resource, sending, in an available subframe for sending the first information in an enhanced manner, the first information in an enhanced manner by using the first frequency resource, where the available subframe is one or more subframes other than a subframe in a subframe set for
(Continued)

sending the second information or sending the second information in an enhanced manner.

24 Claims, 11 Drawing Sheets

(51) Int. Cl.
*H04W 72/04* (2009.01)
*H04W 88/02* (2009.01)
*H04W 88/08* (2009.01)

(58) Field of Classification Search
CPC ... H04L 12/462; H04L 12/4641; H04L 67/12; H04L 1/08; H04W 4/06; H04W 88/16; H04W 72/042; H04W 72/00; H04W 88/08; H04W 88/02; H02H 7/261; H02J 13/0013; Y02B 70/325; Y02E 60/723; Y02E 60/724; Y02E 60/725; Y04S 10/16
See application file for complete search history.

(56) References Cited

U.S. PATENT DOCUMENTS

| | | | |
|---|---|---|---|
| 2009/0232095 A1 | 9/2009 | Ahn et al. | |
| 2012/0320995 A1 | 12/2012 | Dabak et al. | |
| 2013/0083753 A1* | 4/2013 | Lee | H04L 1/0026 370/329 |
| 2013/0242730 A1* | 9/2013 | Pelletier | H04W 28/0284 370/230 |
| 2014/0086173 A1* | 3/2014 | Sadeghi | H04L 5/005 370/329 |
| 2015/0023259 A1 | 1/2015 | Palanki et al. | |
| 2015/0043476 A1 | 2/2015 | Takeda et al. | |
| 2015/0257132 A1* | 9/2015 | Park | H04B 7/068 370/329 |
| 2015/0257173 A1* | 9/2015 | You | H04L 1/1864 370/330 |
| 2015/0289144 A1* | 10/2015 | Yi | H04W 36/22 370/252 |
| 2016/0037362 A1 | 2/2016 | Lee et al. | |
| 2016/0143017 A1* | 5/2016 | Yang | H04W 72/0406 370/329 |
| 2016/0338008 A1* | 11/2016 | Xia | H04W 48/10 |
| 2017/0215194 A1 | 7/2017 | Papasakellariou et al. | |

FOREIGN PATENT DOCUMENTS

| | | |
|---|---|---|
| CN | 103457708 A | 12/2013 |
| EP | 2498436 A2 | 9/2012 |
| IN | 201647009391 | 2/2020 |
| RU | 2435309 C2 | 11/2011 |
| RU | 2466512 C2 | 11/2012 |
| WO | 2008085000 A1 | 7/2008 |
| WO | 2011103309 A2 | 8/2011 |
| WO | 2013141214 A1 | 9/2013 |
| WO | WO 2013141800 A2 | 9/2013 |

OTHER PUBLICATIONS

"Way forward on Remaining details of RE mapping for ePDCCH," 3GPP TSG RAN WG1 Meeting #70, Qingdao, China, R1-123876, 3$^{rd}$ Generation Partnership Project, Valbonne, France (Aug. 13-17, 2012).

"(E) PDCCH transmission for MTC coverage enhancement," 3GPP TSG RAN WG1 Meeting #76, Prague, Czech, Republic, R1-140306, 3$^{rd}$ Generation Partnership Project, Valbonne, France (Feb. 10-14, 2014).

"PBCH coverage Extension Technique," 3GPP TSG RAN WG1 Meeting #75, San Francisco, California, R1-135414, 3$^{rd}$ Generation Partnership Project, Valbonne, France (Nov. 11-15, 2013).

"Coverage enhancement for physical channels and signals for low-cost MTC," 3GPP TSG RAN WG1 Meeting #72, St. Julian's, Malta, R1-130017, pp. 2-11, 3rd Generation Partnership Project, Valbonne, France (Jan. 28-Feb. 1, 2013).

"Details for PRACH preamble coverage enhancement," 3GPP TSG-RAN WG1 Meeting #76, Prague, Czech Republic, R1-140152, pp. 2-9, 3rd Generation Partnership Project, Valbonne, France (Feb. 10-14, 2014).

"Discussion on Multi-level PRACH Coverage Enhancement," 3GPP TSG RAN WG1 Meeting #76, Prague, Czech Republic, R1-140616, pp. 2-8, 3rd Generation Partnership Project, Valbonne, France (Feb. 10-14, 2014).

"Physical Random Access Channel Coverage Enhancement," 3GPP TSG RAN WG1 Meeting #74, Barcelona, Spain, R1-133063, pp. 2-10, 3rd Generation Partnership Project, Valbonne, France (Aug. 19-23, 2013).

"Analysis of (E)PDCCH enhancements and timing relationship with PDSCH," 3GPP TSG-RAN WG1 #74b, Guangzhou, P.R. China, R1-134444, pp. 2-6, 3rd Generation Partnership Project, Valbonne, France (Oct. 7-11, 2013).

\* cited by examiner

INFORMATION TRANSMISSION METHOD, BASE STATION, AND USER EQUIPMENT

CROSS-REFERENCE TO RELATED APPLICATIONS

This application is a continuation of International Patent Application No. PCT/CN2014/072807, filed on Mar. 3, 2014, which is incorporated herein by reference in its entirety.

TECHNICAL FIELD

This application relates to the field of communications technologies, and in particular, to an information transmission method, a base station, and user equipment.

BACKGROUND

Resources in a Long Term Evolution (LTE) or Long Term Evolution Advanced (LTE-A) system are divided into radio frames (which are also referred to as system frames) in time. One radio frame includes 10 subframes, a length of one subframe is 1 ms, and one subframe includes two timeslots. Radio frames are numbered from 0 to 1023, and subframes of each radio frame are numbered from 0 to 9. For a normal cyclic prefix (CP), each timeslot includes seven symbols, and for an extended CP, each timeslot includes six symbols. The resources are divided into subcarriers in frequency. One physical resource block (PRB) is defined as one timeslot in time and 12 subcarriers in frequency.

In the LTE or LTE-A system, system information is classified into a master information block (MIB) and a system information block (SIB).

Generally, the MIB is carried on a physical broadcast channel (PBCH). In the existing LTE or LTE-A system, the PBCH is mapped to four consecutive radio frames, and a period is 40 ms. A start radio frame of the radio frames to which the PBCH is mapped meets SFN mod 4=0, where SFN is a number of the radio frame, and mod ( ) is a modulo operation. The PBCH is mapped to the first four symbols in the second timeslot of a subframe 0, and occupies middle six PRBs in system bandwidth, that is, occupies middle 72 subcarriers. A schematic diagram in a case of a normal CP is shown in FIG. 1.

There are multiple types of SIBs, which are mainly a SIB1, a SIB2, . . . , and a SIB16. A sending period of the SIB1 is 80 ms, that is, eight radio frames, a start location of each period is a radio frame whose SFN mod 8=0, and repeated sending is performed in subframes 5 in radio frames whose radio frame numbers meet SFN mod 2=0 in 80 ms, that is, repeated sending is performed every 20 ms. Other types of SIBs are included in several system information (SI) messages according to different scheduling requirements (such as periods). Each type of SIB is included in one SI message, and only SIBs with a same period can be included in one SI message. An SI message is allowed to be sent within specific duration in time, and the duration is referred to as an SI window. A transmission period of an SI message, a length of an SI window, and a mapping relationship between another type of SIB and an SI message are dynamically scheduled by using the SIB1. In each subframe for transmitting a SIB, the SIB is carried on a physical downlink shared channel (PDSCH), and is scheduled by using downlink control information (DCI) carried on a physical downlink control channel (PDCCH), that is, a frequency resource, an encoding rate, and the like used in SIB transmission are configured.

In the LTE or LTE-A system, user equipment (UE) needs to establish a connection to a network, and this process is generally referred to as a random access process. In the first step of the random access process, the UE sends a random access preamble to a base station. After detecting the random access preamble, the base station sends a random access response (RAR) to the UE. The RAR is sent in any subframe in a random access response window. In a subframe for sending the RAR, the RAR is carried on a PDSCH, and the PDSCH is also scheduled by using DCI carried on a PDCCH.

In the LTE or LTE-A system, a network needs to page (paging) corresponding UE, for UEs in an idle mode (Idle mode) when a service of the UE arrives, or for UEs in an idle mode or a connected mode when a system message needs to be changed or when an earthquake and tsunami warning service or a commercial mobile alert service is to be performed. A time resource for sending a paging message to the UE by the base station is determined according to a paging occasion (PO) and a paging frame (PF). One PF is one radio frame and includes one or more POs. One PO is one subframe, and the base station sends a paging message in this subframe. The PO and the PF are calculated according to a formula specified in a protocol.

In a subframe for sending a paging message, the paging message is carried on a PDSCH, and the PDSCH is scheduled by using DCI carried on a PDCCH.

The MIB, the SIB, the RAR, and the paging message may be referred to as public messages. The PDSCH is further used to carry unicast data in addition to the public messages, and the unicast data may also be referred to as dedicated data of UE. In the existing LTE or LTE-A system, regardless of whether the PDSCH carries the public message or the unicast data, the PDSCH always needs to be scheduled by using DCI carried on a PDCCH.

When a machine type communication (MTC) service is supported in the LTE or LTE-A system, coverage of an LTE or LTE-A network needs to be enhanced to send information in the LTE or LTE-A network in an enhanced manner, which ensures that UE in a basement or with poor channel quality can reliably communicate with the base station.

In the prior art, a method for sending a MIB in an enhanced manner is repeatedly sending a MIB in an existing system in a period of 40 ms. A MIB sent in an enhanced manner is referred to as enhanced sending of the MIB (or a PBCH burst, an enhanced MIB, or an enhanced PBCH). In the period of 40 ms, a manner of sending a MIB in an enhanced manner may be one of the following options: 1. An existing MIB is repeatedly sent only in subframes 0, and other symbols in the subframes 0 than the first four symbols in the second timeslots may be occupied for enhanced sending of the MIB. 2. The existing MIB is repeatedly sent in subframes 5 in odd radio frames and subframes 0. 3. The existing MIB is repeatedly sent in subframes 0 and another subframe in each of all radio frames. 4. The existing MIB is repeatedly sent in subframes 0 and three other subframes in each of all radio frames. A period of 40 ms for sending a MIB in an enhanced manner is one of the following options: A. The MIB is sent in an enhanced manner in each period of 40 ms. B. The base station decides whether the MIB is sent in an enhanced manner in a period of 40 ms, and the base station may dynamically choose whether to send the MIB in an enhanced manner. C. It is decided, based on a predefined pattern, whether to send the MIB in an enhanced manner in a period of 40 ms, where the predefined pattern specifies that among several consecutive periods of 40 ms, the MIB is sent in an enhanced manner in which period of 40 ms, and the MIB is not sent in an enhanced manner in which period of 40 ms. The MIB is also sent in an enhanced manner on middle six PRBs in system bandwidth, that is, 72 subcarriers.

Repeated sending is also an effective method for sending, in an enhanced manner, information carried on a PDSCH. When the PDSCH is used to carry a SIB, a method for sending the SIB in an enhanced manner is still using a SIB type in an existing system. A subframe for sending the SIB in an enhanced manner is the same as an existing subframe for sending the SIB, and a change cycle of the SIB is prolonged. In a change cycle of a SIB, the base station sends same SIBs in subframes for sending a SIB, so that UE can accumulate these same SIBs to improve performance. Alternatively, a new subframe is defined to send an existing SIB in an enhanced manner, the newly defined subframe is different from the existing subframe for sending the SIB, and the SIB is repeatedly sent in the newly defined subframe. Another method for enhancing the SIB is defining a new SIB for UE in a basement or with poor channel quality. For example, a SIB17 or a SIBm is defined, and the new SIB is repeatedly sent in multiple subframes for multiple times, to ensure receiving performance of the UE in the basement or with poor channel quality. When the PDSCH is used to carry a paging message, a method for sending the paging message in an enhanced manner is defining additional PF and PO resources in a new manner of calculating a PF and a PO, and repeatedly sending a same paging message on the additional PF and PO resources. When the PDSCH is used to carry an RAR or unicast data, repeatedly sending, in multiple subframes, a same PDSCH on which the RAR or the unicast data is carried is also an effective method for enhanced sending.

When the information in the LTE or LTE-A network is to be sent in an enhanced manner, when a PDSCH is used to carry unicast data, the unicast data to be sent in an enhanced manner is scheduled by using DCI carried on a PDCCH. When the PDSCH is used to carry a public message, the public message to be sent in an enhanced manner may be scheduled by using DCI carried on a PDCCH, or the public message is not scheduled by using DCI carried on a PDCCH, and is sent in an enhanced manner by using predefined parameters such as a frequency resource and an encoding rate.

When the DCI carried on the PDCCH is used to schedule the PDSCH, the DCI also needs to be sent in an enhanced manner. Repeatedly sending same DCI in multiple subframes is an effective method for sending the DCI in an enhanced manner. The DCI that is repeatedly sent includes resource block allocation that is used to configure a frequency resource used for a PDSCH in multiple subframes.

However, in the prior art, in a method for sending information in an enhanced manner, because a PDSCH that carries unicast data is scheduled by using DCI, and several frequency resources in system bandwidth are configured by means of resource block allocation in the DCI, the several frequency resources or PRB is used to send the unicast data in multiple subframes. The frequency resources configured by means of the resource block allocation in the DCI may overlap a frequency resource used to send a MIB in an enhanced manner, and among the multiple subframes for sending the unicast data by using the frequency resources configured by means of the resource block allocation in the DCI, some subframes are not subframes for sending the MIB in an enhanced manner, and some subframes are subframes for sending the MIB in an enhanced manner. Therefore, enhanced sending of the unicast data may conflict with enhanced sending of the MIB. Likewise, when the PDSCH carries a public message and is scheduled by using the DCI, enhanced sending of the public message may conflict with enhanced sending of the MIB.

When the PDSCH carries the public message and is not scheduled by using the DCI, and the public message is to be repeatedly sent in multiple subframes by using a predefined frequency resource, the predefined frequency resource is used in all the multiple subframes. The predefined frequency resource may overlap a frequency resource used for enhanced sending of the MIB; therefore, when the multiple subframes include a subframe for sending the MIB in an enhanced manner, enhanced sending of the public message may conflict with the enhanced sending of the MIB.

In addition, in a case in which the base station dynamically decides whether a MIB is sent in an enhanced manner in a period of 40 ms, from a perspective of the UE, the UE does not know whether the base station sends the MIB in an enhanced manner in a period of 40 ms, and therefore, does not know whether enhanced sending of unicast data or a public message carried on a PDSCH conflicts with enhanced sending of the MIB.

In addition, when the PDSCH is used to carry different information, in multiple subframes for sending information in an enhanced manner, a frequency resource configured by means of resource block allocation in DCI or a predefined frequency resource is used to send the information in an enhanced manner. There may be an overlapping frequency resource between frequency resources configured or predefined for enhanced sending of the different information; therefore, in some subframes, enhanced sending of at least two types of information in a SIB, an RAR, a paging message, or unicast data may conflict with each other. There may also be an overlapping frequency resource between a frequency resource configured or predefined for enhanced sending of information and a frequency resource configured for sending of information; therefore, in some subframes, enhanced sending of a SIB, an RAR, a paging message, or unicast data may conflict with sending of at least one type of the information. Enhanced sending of unicast data of different users may conflict with each other, or enhanced sending and sending of unicast data may also conflict with each other. An effective conflict resolving solution is absent from the prior art.

SUMMARY

This application provides an information transmission method, a base station, and user equipment, so as to resolve a technical problem in the prior art that a conflict occurs in enhanced sending of information when frequency resources used for enhanced sending of different information overlap or when frequency resources used for enhanced sending of information and sending of the information overlap.

A first aspect of this application provides an information transmission method, including:

determining a first frequency resource, where the first frequency resource is a frequency resource used to send first information in an enhanced manner; determining a second frequency resource, where the second frequency resource is a frequency resource used to send second information or send second information in an enhanced manner; and when there is an overlapping frequency resource between the first frequency resource and the second frequency resource, sending, in an available subframe for sending the first information in an enhanced manner, the first information in an enhanced manner by using the first frequency resource, where the available subframe is one or more subframes other than a subframe in a subframe set for sending the second information or sending the second information in an enhanced manner; or sending, in a subframe in a subframe set for sending the second information or sending the second information in an enhanced manner, the first information in an enhanced manner on a frequency resource other than the overlapping frequency resource in the first frequency resource.

With reference to the first aspect, in a first possible implementation manner of the first aspect, the sending, in a subframe in a subframe set for sending the second information or sending the second information in an enhanced manner, the first information in an enhanced manner on a frequency resource other than the overlapping frequency resource in the first frequency resource includes: sending, in the subframe in the subframe set for sending the second information or sending the second information in an enhanced manner, the first information in an enhanced manner on an available physical resource block PRB for the first information, where the available PRB for the first information is specifically a PRB, other than a PRB on which the overlapping frequency resource is located, in PRBs on which the first frequency resource is located.

With reference to the first possible implementation manner of the first aspect, in a second possible implementation manner of the first aspect, the sending the first information in an enhanced manner on an available physical resource block PRB for the first information includes: determining, according to a quantity of PRBs on which the first frequency resource is located, a quantity of all available bits for one transport block of the first information; selecting a sending bit of the transport block of the first information according to the quantity of all available bits; and mapping a modulation symbol of the first information to a resource element RE included in the PRB on which the first frequency resource is located, and when a first RE in the RE is included in the PRB on which the overlapping frequency resource is located, discarding a modulation symbol corresponding to the first RE.

With reference to the first possible implementation manner of the first aspect, in a third possible implementation manner of the first aspect, the sending the first information in an enhanced manner on an available physical resource block PRB for the first information includes: determining, according to a quantity of available PRBs for the first information, a quantity of all available bits for one transport block of the first information; selecting a sending bit of the transport block of the first information according to the quantity of all available bits; and mapping a modulation symbol of the first information to a resource element RE included in the available PRB for the first information.

With reference to the first aspect, in a fourth possible implementation manner of the first aspect, in the subframe in the subframe set for sending the second information or sending the second information in an enhanced manner, at least one subframe is a subframe within duration for sending the first information in an enhanced manner, and the duration is a period for sending the first information in an enhanced manner or duration between a start subframe for sending the first information in an enhanced manner and an end subframe for sending the first information in an enhanced manner.

With reference to the first aspect or any one of the first possible implementation manner of the first aspect to the fourth possible implementation manner of the first aspect, in a fifth possible implementation manner of the first aspect, the first information is specifically at least one of unicast data, a system information block, or a random access response RAR, and the second information is specifically a master information block.

With reference to the fifth possible implementation manner of the first aspect, in a sixth possible implementation manner of the first aspect, the subframe set for sending the second information or sending the second information in an enhanced manner includes subframes, whose numbers are the same as that of a subframe for sending the second information or sending the second information in an enhanced manner, in all radio frames; or the subframe set for sending the second information or sending the second information in an enhanced manner includes a subframe for sending the second information or sending the second information in an enhanced manner.

With reference to the first aspect or any one of the first possible implementation manner of the first aspect to the fourth possible implementation manner of the first aspect, in a seventh possible implementation manner of the first aspect, the first information is specifically a random access response RAR, and the second information is specifically a system information block; or the first information is specifically a paging message, and the second information is specifically a system information block and/or a random access response RAR; or the first information is specifically unicast data, and the second information is specifically at least one of a system information block, a random access response RAR, or a paging message; or the first information is specifically first unicast data, and the second information is specifically second unicast data, where the first unicast data and the second unicast data are different unicast data.

With reference to the first aspect or any one of the first possible implementation manner of the first aspect to the fourth possible implementation manner of the first aspect, in an eighth possible implementation manner of the first aspect, when the first information or the second information is another system information block than a type-1 system information block, the method further includes: sending or sending, in an enhanced manner, the type-1 system information block, where the type-1 system information block includes configuration information of the first frequency resource or the second frequency resource.

A second aspect of this application further provides an information transmission method, including:

determining a first frequency resource, where the first frequency resource is a frequency resource used to send first information in an enhanced manner; determining a second frequency resource, where the second frequency resource is a frequency resource used to send second information or send second information in an enhanced manner; and when there is an overlapping frequency resource between the first frequency resource and the second frequency resource, receiving, in an available subframe for sending the first information in an enhanced manner, the first information in an enhanced manner on the first frequency resource, where the available subframe is one or more subframes other than a subframe in a subframe set for sending the second information or sending the second information in an enhanced manner; or receiving, in a subframe in a subframe set for sending the second information or sending the second information in an enhanced manner, the first information in an enhanced manner on a frequency resource other than the overlapping frequency resource in the first frequency resource.

With reference to the second aspect, in a first possible implementation manner of the second aspect, the receiving, in a subframe in a subframe set for sending the second information or sending the second information in an enhanced manner, the first information in an enhanced manner on a frequency resource other than the overlapping frequency resource in the first frequency resource includes: receiving, in the subframe in the subframe set for sending the second information or sending the second information in an enhanced manner, the first information in an enhanced manner on an available physical resource block PRB for the first information, where the available PRB for the first information is specifically a PRB, other than a PRB on which the overlapping frequency resource is located, in PRBs on which the first frequency resource is located.

With reference to the second aspect, in a second possible implementation manner of the second aspect, in the subframe in the subframe set for sending the second information or sending the second information in an enhanced manner, at least one subframe is a subframe within duration for sending the first information in an enhanced manner, and the duration is a period for sending the first information in an enhanced manner or duration between a start subframe for sending the first information in an enhanced manner and an end subframe for sending the first information in an enhanced manner.

With reference to the second aspect or the first possible implementation manner of the second aspect or the second possible implementation manner of the second aspect, in a third possible implementation manner of the second aspect, the first information is specifically at least one of unicast data, a system information block, or a random access response RAR, and the second information is specifically a master information block.

With reference to the third possible implementation manner of the second aspect, in a fourth possible implementation manner of the second aspect, the subframe set for sending the second information or sending the second information in an enhanced manner includes subframes, whose numbers are the same as that of a subframe for sending the second information or sending the second information in an enhanced manner, in all radio frames; or the subframe set for sending the second information or sending the second information in an enhanced manner includes a subframe for sending the second information or sending the second information in an enhanced manner.

With reference to the second aspect or the first possible implementation manner of the second aspect or the second possible implementation manner of the second aspect, in a fifth possible implementation manner of the second aspect, the first information is specifically a random access response RAR, and the second information is specifically a system information block; or the first information is specifically a paging message, and the second information is specifically a system information block and/or a random access response RAR; or the first information is specifically unicast data, and the second information is specifically at least one of a system information block, a random access response RAR, or a paging message; or the first information is specifically first unicast data, and the second information is specifically second unicast data, where the first unicast data and the second unicast data are different unicast data.

With reference to the second aspect or the first possible implementation manner of the second aspect or the second possible implementation manner of the second aspect, in a sixth possible implementation manner of the second aspect, when the first information or the second information is another system information block than a type-1 system information block, the method further includes: receiving or receiving, in an enhanced manner, the type-1 system information block; and the determining a first frequency resource or the determining a second frequency resource is specifically: determining the first frequency resource or the second frequency resource according to configuration information included in the type-1 system information block.

A third aspect of this application provides a base station, including:

a first determining unit, configured to determine a first frequency resource, where the first frequency resource is a frequency resource used to send first information in an enhanced manner; a second determining unit, configured to determine a second frequency resource, where the second frequency resource is a frequency resource used to send second information or send second information in an enhanced manner; and a sending unit, configured to: when there is an overlapping frequency resource between the first frequency resource and the second frequency resource, send, in an available subframe for sending the first information in an enhanced manner, the first information in an enhanced manner by using the first frequency resource, where the available subframe is one or more subframes other than a subframe in a subframe set for sending the second information or sending the second information in an enhanced manner; or send, in a subframe in a subframe set for sending the second information or sending the second information in an enhanced manner, the first information in an enhanced manner on a frequency resource other than the overlapping frequency resource in the first frequency resource.

With reference to the third aspect, in a first possible implementation manner of the third aspect, the sending unit is specifically configured to send, in the subframe in the subframe set for sending the second information or sending the second information in an enhanced manner, the first information in an enhanced manner on an available physical resource block PRB for the first information, where the available PRB for the first information is specifically a PRB, other than a PRB on which the overlapping frequency resource is located, in PRBs on which the first frequency resource is located.

With reference to the first possible implementation manner of the third aspect, in a second possible implementation manner of the third aspect, the sending unit is specifically configured to: determine, according to a quantity of PRBs on which the first frequency resource is located, a quantity of all available bits for one transport block of the first information; select a sending bit of the transport block of the first information according to the quantity of all available bits; and map a modulation symbol of the first information to a resource element RE included in the PRB on which the first frequency resource is located, and when a first RE in the RE is included in the PRB on which the overlapping frequency resource is located, discard a modulation symbol corresponding to the first RE.

With reference to the first possible implementation manner of the third aspect, in a third possible implementation manner of the third aspect, the sending unit is specifically configured to: determine, according to a quantity of available PRBs for the first information, a quantity of all available bits for one transport block of the first information;

select a sending bit of the transport block of the first information according to the quantity of all available bits; and map a modulation symbol of the first information to a resource element RE included in the available PRB for the first information.

With reference to the third aspect, in a fourth possible implementation manner of the third aspect, in the subframe in the subframe set for sending the second information or sending the second information in an enhanced manner, at least one subframe is a subframe within duration for sending the first information in an enhanced manner, and the duration is a period for sending the first information in an enhanced manner or duration between a start subframe for sending the first information in an enhanced manner and an end subframe for sending the first information in an enhanced manner.

With reference to the third aspect or any one of the first possible implementation manner of the third aspect to the fourth possible implementation manner of the third aspect, in a fifth possible implementation manner of the third aspect, the first information is specifically at least one of unicast data, a system information block, or a random access response RAR, and the second information is specifically a master information block.

With reference to the fifth possible implementation manner of the third aspect, in a sixth possible implementation manner of the third aspect, the subframe set for sending the second information or sending the second information in an enhanced manner includes subframes, whose numbers are the same as that of a subframe for sending the second information or sending the second information in an enhanced manner, in all radio frames; or the subframe set for sending the second information or sending the second information in an enhanced manner includes a subframe for sending the second information or sending the second information in an enhanced manner.

With reference to the third aspect or any one of the first possible implementation manner of the third aspect to the fourth possible implementation manner of the third aspect, in a seventh possible implementation manner of the third aspect, the first information is specifically a random access response RAR, and the second information is specifically a system information block; or the first information is specifically a paging message, and the second information is specifically a system information block and/or a random access response RAR; or the first information is specifically unicast data, and the second information is specifically at least one of a system information block, a random access response RAR, or a paging message; or the first information is specifically first unicast data, and the second information is specifically second unicast data, where the first unicast data and the second unicast data are different unicast data.

With reference to the third aspect or any one of the first possible implementation manner of the third aspect to the fourth possible implementation manner of the third aspect, in an eighth possible implementation manner of the third aspect, when the first information or the second information is another system information block than a type-1 system information block, the sending unit is further configured to send or send, in an enhanced manner, the type-1 system information block, where the type-1 system information block includes configuration information of the first frequency resource or the second frequency resource.

A fourth aspect of this application further provides a base station, including:

a processor, configured to determine a first frequency resource and a second frequency resource, where the first frequency resource is a frequency resource used to send first information in an enhanced manner, and the second frequency resource is a frequency resource used to send second information or send second information in an enhanced manner; and a transmitter, configured to: when there is an overlapping frequency resource between the first frequency resource and the second frequency resource, send, in an available subframe for sending the first information in an enhanced manner, the first information in an enhanced manner by using the first frequency resource, where the available subframe is one or more subframes other than a subframe in a subframe set for sending the second information or sending the second information in an enhanced manner; or send, in a subframe in a subframe set for sending the second information or sending the second information in an enhanced manner, the first information in an enhanced manner on a frequency resource other than the overlapping frequency resource in the first frequency resource.

With reference to the fourth aspect, in a first possible implementation manner of the fourth aspect, the transmitter is specifically configured to send, in the subframe in the subframe set for sending the second information or sending the second information in an enhanced manner, the first information in an enhanced manner on an available physical resource block PRB for the first information, where the available PRB for the first information is specifically a PRB, other than a PRB on which the overlapping frequency resource is located, in PRBs on which the first frequency resource is located.

With reference to the first possible implementation manner of the fourth aspect, in a second possible implementation manner of the fourth aspect, the transmitter is specifically configured to: determine, according to a quantity of PRBs on which the first frequency resource is located, a quantity of all available bits for one transport block of the first information; select a sending bit of the transport block of the first information according to the quantity of all available bits; and map a modulation symbol of the first information to a resource element RE included in the PRB on which the first frequency resource is located, and when a first RE in the RE is included in the PRB on which the overlapping frequency resource is located, discard a modulation symbol corresponding to the first RE.

With reference to the first possible implementation manner of the fourth aspect, in a third possible implementation manner of the fourth aspect, the transmitter is specifically configured to: determine, according to a quantity of available PRBs for the first information, a quantity of all available bits for one transport block of the first information; select a sending bit of the transport block of the first information according to the quantity of all available bits; and map a modulation symbol of the first information to a resource element RE included in the available PRB for the first information.

With reference to the fourth aspect, in a fourth possible implementation manner of the fourth aspect, in the subframe in the subframe set for sending the second information or sending the second information in an enhanced manner, at least one subframe is a subframe within duration for sending the first information in an enhanced manner, and the duration is a period for sending the first information in an enhanced manner or duration between a start subframe for sending the first information in an enhanced manner and an end subframe for sending the first information in an enhanced manner.

With reference to the fourth aspect or any one of the first possible implementation manner of the fourth aspect to the fourth possible implementation manner of the fourth aspect, in a fifth possible implementation manner of the fourth aspect, the first information is specifically at least one of unicast data, a system information block, or a random access response RAR, and the second information is specifically a master information block.

With reference to the fifth possible implementation manner of the fourth aspect, in a sixth possible implementation manner of the fourth aspect, the subframe set for sending the second information or sending the second information in an enhanced manner includes subframes, whose numbers are the same as that of a subframe for sending the second information or sending the second information in an enhanced manner, in all radio frames; or the subframe set for sending the second information or sending the second information in an enhanced manner includes a subframe for sending the second information or sending the second information in an enhanced manner.

With reference to the fourth aspect or any one of the first possible implementation manner of the fourth aspect to the fourth possible implementation manner of the fourth aspect, in a seventh possible implementation manner of the fourth aspect, the first information is specifically a random access response RAR, and the second information is specifically a system information block; or the first information is specifically a paging message, and the second information is specifically a system information block and/or a random access response RAR; or the first information is specifically unicast data, and the second information is specifically at least one of a system information block, a random access response RAR, or a paging message; or the first information is specifically first unicast data, and the second information is specifically second unicast data, where the first unicast data and the second unicast data are different unicast data.

With reference to the fourth aspect or any one of the first possible implementation manner of the fourth aspect to the fourth possible implementation manner of the fourth aspect, in an eighth possible implementation manner of the fourth aspect, when the first information or the second information is another system information block than a type-1 system information block, the transmitter is further configured to send or send, in an enhanced manner, the type-1 system information block, where the type-1 system information block includes configuration information of the first frequency resource or the second frequency resource.

A fifth aspect of this application provides user equipment, including:

a first determining unit, configured to determine a first frequency resource, where the first frequency resource is a frequency resource used to send first information in an enhanced manner; a second determining unit, configured to determine a second frequency resource, where the second frequency resource is a frequency resource used to send second information or send second information in an enhanced manner; and a receiving unit, configured to: when there is an overlapping frequency resource between the first frequency resource and the second frequency resource, receive, in an available subframe for sending the first information in an enhanced manner, the first information in an enhanced manner on the first frequency resource, where the available subframe is one or more subframes other than a subframe in a subframe set for sending the second information or sending the second information in an enhanced manner; or receive, in a subframe in a subframe set for sending the second information or sending the second information in an enhanced manner, the first information in an enhanced manner on a frequency resource other than the overlapping frequency resource in the first frequency resource.

With reference to the fifth aspect, in a first possible implementation manner of the fifth aspect, the receiving unit is specifically configured to receive, in the subframe in the subframe set for sending the second information or sending the second information in an enhanced manner, the first information in an enhanced manner on an available physical resource block PRB for the first information, where the available PRB for the first information is specifically a PRB, other than a PRB on which the overlapping frequency resource is located, in PRBs on which the first frequency resource is located.

With reference to the fifth aspect, in a second possible implementation manner of the fifth aspect, in the subframe in the subframe set for sending the second information or sending the second information in an enhanced manner, at least one subframe is a subframe within duration for sending the first information in an enhanced manner, and the duration is a period for sending the first information in an enhanced manner or duration between a start subframe for sending the first information in an enhanced manner and an end subframe for sending the first information in an enhanced manner.

With reference to the fifth aspect or the first possible implementation manner of the fifth aspect or the second possible implementation manner of the fifth aspect, in a third possible implementation manner of the fifth aspect, the first information is specifically at least one of unicast data, a system information block, or a random access response RAR, and the second information is specifically a master information block.

With reference to the third possible implementation manner of the fifth aspect, in a fourth possible implementation manner of the fifth aspect, the subframe set for sending the second information or sending the second information in an enhanced manner includes subframes, whose numbers are the same as that of a subframe for sending the second information or sending the second information in an enhanced manner, in all radio frames; or the subframe set for sending the second information or sending the second information in an enhanced manner includes a subframe for sending the second information or sending the second information in an enhanced manner.

With reference to the fifth aspect or the first possible implementation manner of the fifth aspect or the second possible implementation manner of the fifth aspect, in a fifth possible implementation manner of the fifth aspect, the first information is specifically a random access response RAR, and the second information is specifically a system information block; or the first information is specifically a paging message, and the second information is specifically a system information block and/or a random access response RAR; or the first information is specifically unicast data, and the second information is specifically at least one of a system information block, a random access response RAR, or a paging message; or the first information is specifically first unicast data, and the second information is specifically second unicast data, where the first unicast data and the second unicast data are different unicast data.

With reference to the fifth aspect or the first possible implementation manner of the fifth aspect or the second possible implementation manner of the fifth aspect, in a sixth possible implementation manner of the fifth aspect, when the first information or the second information is another system information block than a type-1 system information block, the receiving unit is further configured to receive or receive, in an enhanced manner, the type-1 system information block; and the first determining unit or the second determining unit is specifically configured to determine the first frequency resource or the second frequency resource according to configuration information included in the type-1 system information block that is received by the receiving unit.

A sixth aspect of this application further provides user equipment, including:

a processor, configured to determine a first frequency resource and a second frequency resource, where the first frequency resource is a frequency resource used to send first information in an enhanced manner, and the second frequency resource is a frequency resource used to send second information or send second information in an enhanced manner; and a receiver, configured to: when there is an overlapping frequency resource between the first frequency resource and the second frequency resource, receive, in an available subframe for sending the first information in an enhanced manner, the first information in an enhanced manner on the first frequency resource, where the available subframe is one or more subframes other than a subframe in a subframe set for sending the second information or sending the second information in an enhanced manner; or receive, in a subframe in a subframe set for sending the second information or sending the second information in an enhanced manner, the first information in an enhanced manner on a frequency resource other than the overlapping frequency resource in the first frequency resource.

With reference to the sixth aspect, in a first possible implementation manner of the sixth aspect, the receiver is specifically configured to receive, in the subframe in the subframe set for sending the second information or sending the second information in an enhanced manner, the first information in an enhanced manner on an available physical resource block PRB for the first information, where the available PRB for the first information is specifically a PRB other than a PRB on which the overlapping frequency resource is located, in PRBs on which the first frequency resource is located.

With reference to the sixth aspect, in a second possible implementation manner of the sixth aspect, in the subframe in the subframe set for sending the second information or sending the second information in an enhanced manner, at least one subframe is a subframe within duration for sending the first information in an enhanced manner, and the duration is a period for sending the first information in an enhanced manner or duration between a start subframe for sending the first information in an enhanced manner and an end subframe for sending the first information in an enhanced manner.

With reference to the sixth aspect or the first possible implementation manner of the sixth aspect or the second possible implementation manner of the sixth aspect, in a third possible implementation manner of the sixth aspect, the first information is specifically at least one of unicast data, a system information block, or a random access response RAR, and the second information is specifically a master information block.

With reference to the third possible implementation manner of the sixth aspect, in a fourth possible implementation manner of the sixth aspect, the subframe set for sending the second information or sending the second information in an enhanced manner includes subframes, whose numbers are the same as that of a subframe for sending the second information or sending the second information in an enhanced manner, in all radio frames; or the subframe set for sending the second information or sending the second information in an enhanced manner includes a subframe for sending the second information or sending the second information in an enhanced manner.

With reference to the sixth aspect or the first possible implementation manner of the sixth aspect or the second possible implementation manner of the sixth aspect, in a fifth possible implementation manner of the sixth aspect, the first information is specifically a random access response RAR, and the second information is specifically a system information block; or the first information is specifically a paging message, and the second information is specifically a system information block and/or a random access response RAR; or the first information is specifically unicast data, and the second information is specifically at least one of a system information block, a random access response RAR, or a paging message; or the first information is specifically first unicast data, and the second information is specifically second unicast data, where the first unicast data and the second unicast data are different unicast data.

With reference to the sixth aspect or the first possible implementation manner of the sixth aspect or the second possible implementation manner of the sixth aspect, in a sixth possible implementation manner of the sixth aspect, when the first information or the second information is another system information block than a type-1 system information block, the receiver is further configured to receive or receive, in an enhanced manner, the type-1 system information block; and the processor is specifically configured to determine the first frequency resource or the second frequency resource according to configuration information included in the type-1 system information block that is received by the receiver.

One or more technical solutions provided in the embodiments of this application have at least the following technical effects or advantages:

According to an information transmission method in the embodiments of this application, a first frequency resource is determined, where the first frequency resource is a frequency resource used to send first information in an enhanced manner; a second frequency resource is determined, where the second frequency resource is a frequency resource used to send second information or send second information in an enhanced manner; and when there is an overlapping frequency resource between the first frequency resource and the second frequency resource, in an available subframe for sending the first information in an enhanced manner, the first information is sent in an enhanced manner by using the first frequency resource, where the available subframe for sending the first information in an enhanced manner is one or more subframes other than a subframe in a subframe set for sending the second information or sending the second information in an enhanced manner; or in a subframe in a subframe set for sending the second information or sending the second information in an enhanced manner, the first information is sent in an enhanced manner on a frequency resource other than the overlapping frequency resource in the first frequency resource. Therefore, the embodiments provide two effective methods for avoiding a conflict when there is an overlapping frequency resource between frequency resources for enhanced sending of different information or between frequency resources for enhanced sending of different information and sending of different information.

DESCRIPTION OF EMBODIMENTS

Figure 1:
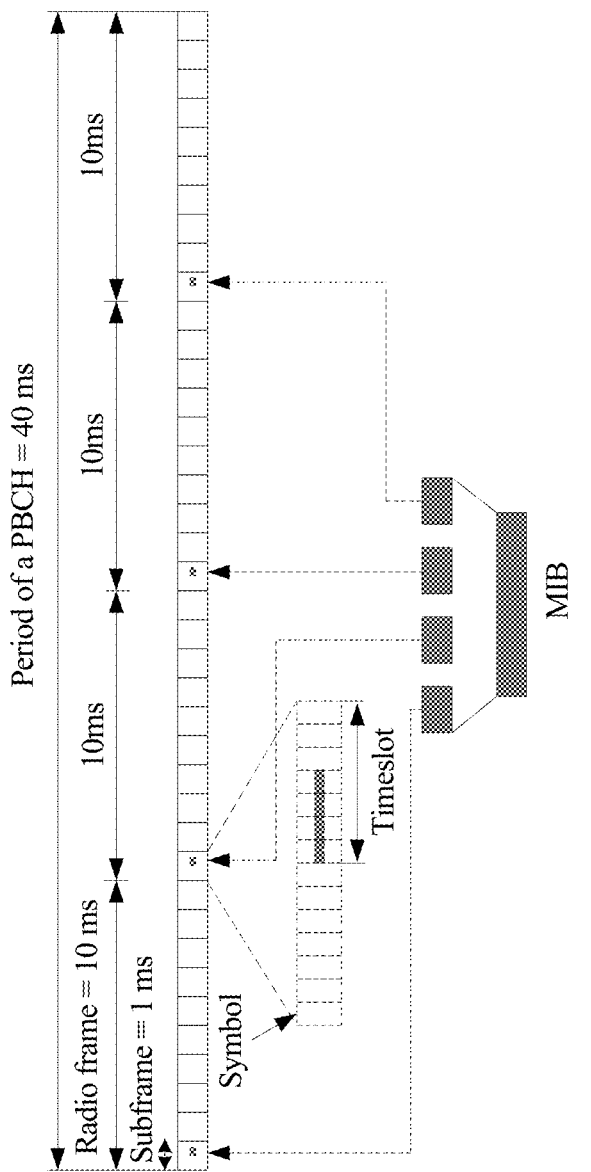
FIG. 1 is a schematic diagram of mapping of a physical broadcast channel to four consecutive radio frames in the prior art.

Embodiments of this application provide an information transmission method, a base station, and user equipment, so as to resolve a technical problem in the prior art that a conflict occurs in enhanced sending of information when frequency resources used for enhanced sending of different information overlap or when frequency resources used for enhanced sending of information and sending of the information overlap.

To resolve the foregoing technical problem, a general idea of technical solutions in the embodiments of this application is as follows:

According to an information transmission method in the embodiments of this application, a first frequency resource is determined, where the first frequency resource is a frequency resource used to send first information in an enhanced manner; a second frequency resource is determined, where the second frequency resource is a frequency resource used to send second information or send second information in an enhanced manner; and when there is an overlapping frequency resource between the first frequency resource and the second frequency resource, in an available subframe for sending the first information in an enhanced manner, the first information is sent in an enhanced manner by using the first frequency resource, where the available subframe for sending the first information in an enhanced manner is one or more subframes other than a subframe in a subframe set for sending the second information or sending the second information in an enhanced manner; or in a subframe in a subframe set for sending the second information or sending the second information in an enhanced manner, the first information is sent in an enhanced manner on a frequency resource other than the overlapping frequency resource in the first frequency resource. Therefore, the embodiments provide two effective methods for avoiding a conflict when there is an overlapping frequency resource between frequency resources for enhanced sending of different information or between frequency resources for enhanced sending of different information and sending of different information. When there is no overlapping frequency resource between the first frequency resource and the second frequency resource, in a subframe for sending the first information in an enhanced manner, the first information is sent in an enhanced manner by using the first frequency resource; in a subframe for sending the second information, the second information is sent by using the second frequency resource; in a subframe for sending the second information in an enhanced manner, the second information is sent in an enhanced manner by using the second frequency resource.

To make the objectives, technical solutions, and advantages of the embodiments of this application clearer, the following clearly describes the technical solutions in the embodiments of this application with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

This specification describes various aspects with reference to user equipment and/or a base station.

The user equipment may be a wireless terminal or may be a wired terminal. The wireless terminal may refer to a device that provides voice and/or data connectivity for a user, a handheld device with a radio connection function, or another processing device connected to a radio modem. The wireless terminal may communicate with one or more core networks by using a radio access network (such as RAN, Radio Access Network). The wireless terminal may be a mobile terminal such as a mobile phone (or referred to as a "cellular" phone) or a computer with a mobile terminal, for example, may be a portable, pocket-sized, handheld, computer built-in, or in-vehicle mobile apparatus, which exchanges voice and/or data with the radio access network, for example, a device such as a personal communications service (PCS) phone, a cordless telephone set, a Session Initiation Protocol (SIP) phone, a wireless local loop (WLL) station, a personal digital assistant (PDA), or a meter that has a function of automatically reading water/electricity/gas. The wireless terminal may also be referred to as a system, a subscriber unit, a subscriber station, a mobile station, a mobile, a remote station, an access point, a remote terminal, an access terminal, a user terminal, a user agent, user device, or user equipment.

The base station (for example, an access point) may refer to a device that is in an access network and communicates, over an air interface, with the wireless terminal by using one or more sectors. The base station may be configured to mutually convert a received over-the-air frame and an IP packet and serve as a router between the wireless terminal and a remaining portion of the access network, where the remaining portion of the access network may include an Internet Protocol (IP) network. The base station may further coordinate attribute management of the air interface. For example, the base station may be a base transceiver station (BTS) in GSM, or may be a NodeB (NodeB) in UTMS, or may be an evolved NodeB (NodeB or eNB or e-NodeB) in LTE or LTE-A, which is not limited in this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following describes implementation manners of this application in details with reference to the accompanying drawings.

Embodiment 1

Figure 2:
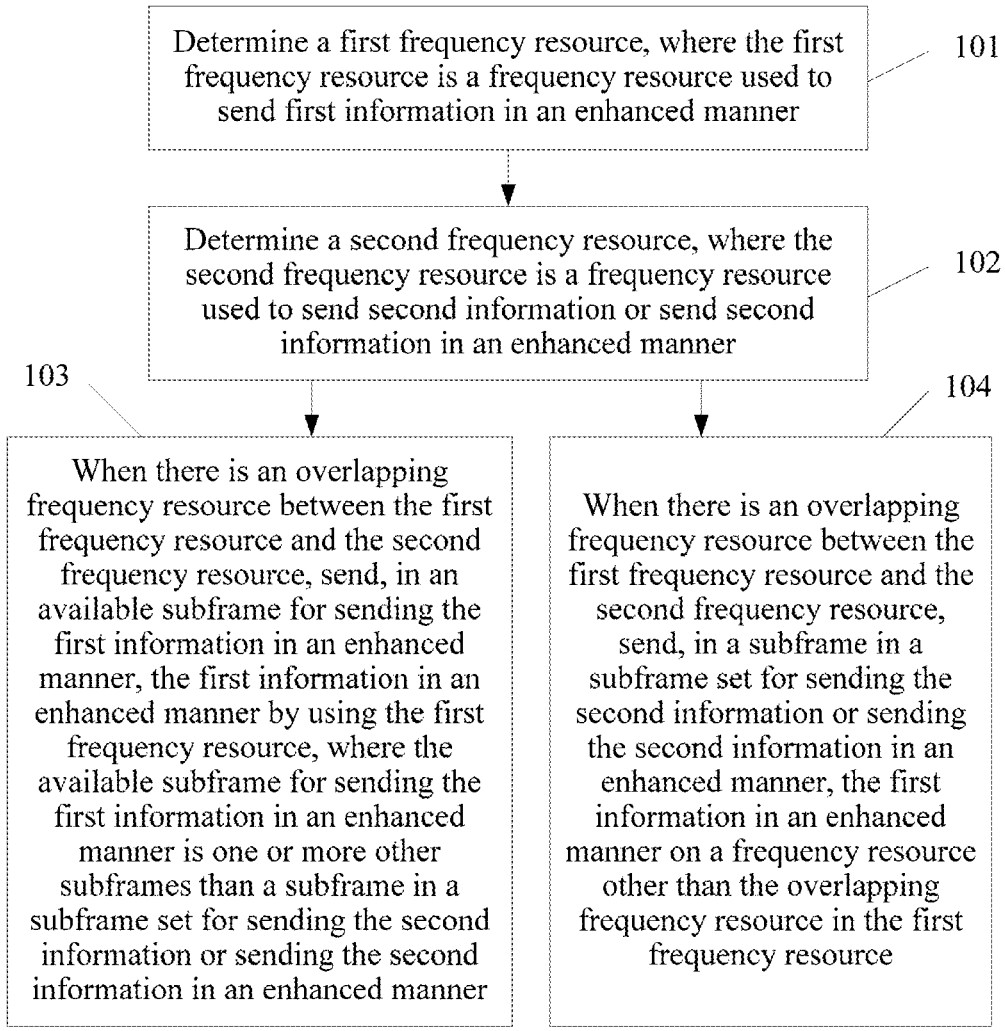
FIG. 2 is a flowchart of an information transmission method on a base station side according to an embodiment of this application.

This embodiment provides an information transmission method. Referring to FIG. 2, FIG. 2 is a flowchart of the information transmission method in this embodiment. The method includes:

Step 101: Determine a first frequency resource, where the first frequency resource is a frequency resource used to send first information in an enhanced manner.

Step 102: Determine a second frequency resource, where the second frequency resource is a frequency resource used to send second information or send second information in an enhanced manner.

When there is an overlapping frequency resource between the first frequency resource and the second frequency resource, step 103 or step 104 is performed.

Step 103: Send, in an available subframe for sending the first information in an enhanced manner, the first information in an enhanced manner by using the first frequency resource, where the available subframe for sending the first information in an enhanced manner is one or more subframes other than a subframe in a subframe set for sending the second information or sending the second information in an enhanced manner.

Step 104: Send, in a subframe in a subframe set for sending the second information or sending the second information in an enhanced manner, the first information in an enhanced manner on a frequency resource other than the overlapping frequency resource in the first frequency resource.

Step 101 and step 102 may be performed at the same time or may be performed sequentially. Further, manners of determining the first frequency resource and the second frequency resource in step 101 and step 102 may be the same or may be different, which generally depends on information types of the first information and the second information. For example, a possible implementation manner is as follows: A base station determines the first frequency resource and/or the second frequency resource according to scheduling of the base station, then sends or sends, in an enhanced manner, DCI carried on a physical downlink control channel (PDCCH), and notifies UE of the determined first frequency resource and/or the determined second frequency resource by means of resource block allocation in the DCI; or a base station determines the first frequency resource and/or the second frequency resource in a predefined manner, where the predefined manner may be protocol agreement.

When there is an overlapping frequency resource between the first frequency resource and the second frequency resource, for example, if the first frequency resource is totally 36 subcarriers from the $0^{th}$ subcarrier to the $35^{th}$ subcarrier, and the second frequency resource is totally 23 subcarriers from the $0^{th}$ subcarrier to the $22^{nd}$ subcarrier, there is an overlapping frequency resource of totally 23 subcarriers from the $0^{th}$ subcarrier to the $22^{nd}$ subcarrier between the first frequency resource and the second frequency resource, the first information may be sent in an enhanced manner in a manner in step 103 or step 104, and on the second frequency resource, the second information may be sent or the second information may be sent in an enhanced manner.

In step 103, in the available subframe for sending the first information in an enhanced manner, the first information is sent in an enhanced manner by using the first frequency resource, where the available subframe for sending the first information in an enhanced manner is the one or more subframes other than the subframe in the subframe set for sending the second information or sending the second information in an enhanced manner. That is, in a subframe for sending the second information or sending the second information in an enhanced manner, the second information is sent or the second information is sent in an enhanced manner by using the second frequency resource; and in the subframe in the subframe set for sending the second information or sending the second information in an enhanced manner, the first information is not sent in an enhanced manner. The subframe set for sending the second information or sending the second information in an enhanced manner includes the subframe for sending the second information or sending the second information in an enhanced manner.

Further, in step 103, in the subframe in the subframe set for sending the second information or sending the second information in an enhanced manner, at least one subframe is a subframe within duration for sending the first information in an enhanced manner, where the duration for sending the first information in an enhanced manner is a period for sending the first information in an enhanced manner or duration between a start subframe for sending the first information in an enhanced manner and an end subframe for sending the first information in an enhanced manner. That is, the duration for sending the first information in an enhanced manner includes the at least one subframe in the subframe set for sending the second information or sending the second information in an enhanced manner, and in one or more other subframes than the subframe in the subframe set for sending the second information or sending the second information in an enhanced manner, in all subframes included in the duration for sending the first information in an enhanced manner, the first information is sent in an enhanced manner by using the first frequency resource. In this way, when the first information is to be sent in an enhanced manner, a period of time in which no second information is to be sent or sent in an enhanced manner does not need to be found to send the first information in an enhanced manner. The duration for sending the first information in an enhanced manner may be selected without considering completely avoiding a time location of the second information, provided that a subframe for the second information is avoided within the duration.

In step 104, in the subframe in the subframe set for sending the second information or sending the second information in an enhanced manner, the first information is sent in an enhanced manner on the frequency resource other than the overlapping frequency resource in the first frequency resource. That is, the second frequency resource is used normally, to send the second information in a subframe for sending the second information, or send, in an enhanced manner, the second information in a subframe for sending the second information in an enhanced manner; however, if a subframe for sending the first information in an enhanced manner is also a subframe in the subframe set for sending the second information or sending the second information in an enhanced manner, in the subframe in the subframe set for sending the second information or sending the second information in an enhanced manner, the first information is sent in an enhanced manner on the frequency resource other than the overlapping frequency resource in the first frequency resource, and in other words, the first information is not sent in an enhanced manner on the overlapping frequency resource; in a subframe, other than the subframe in the subframe set for sending the second information or sending the second information in an enhanced manner, in the subframe for sending the first information in an enhanced manner, the first information is sent by using the first frequency resource normally.

For example, in the subframe in the subframe set for sending the second information or sending the second information in an enhanced manner, if the first frequency resource is totally 36 subcarriers from the $0^{th}$ subcarrier to the $35^{th}$ subcarrier, and the second frequency resource is totally 23 subcarriers from the $0^{th}$ subcarrier to the $22^{nd}$ subcarrier, the first information is sent in an enhanced manner on totally 13 subcarriers from the $23^{rd}$ subcarrier to the $35^{th}$ subcarrier other than an overlapping frequency resource of totally 23 subcarriers from the $0^{th}$ subcarrier to the $22^{nd}$ subcarrier; that is, the first information is not sent in an enhanced manner on the overlapping frequency resource of totally 23 subcarriers from the $0^{th}$ subcarrier to the $22^{nd}$ subcarrier.

Further, step 104 may be further specifically: sending, in the subframe in the subframe set for sending the second information or sending the second information in an enhanced manner, the first information in an enhanced manner on an available physical resource block (PRB) for the first information, where the available PRB for the first information is specifically a PRB, other than a PRB on which the overlapping frequency resource is located, in PRBs on which the first frequency resource is located. For example, the foregoing first frequency resource and the foregoing second frequency resource are still used as examples for description. If the first frequency resource is totally 36 subcarriers from the $0^{th}$ subcarrier to the $35^{th}$ subcarrier, and the second frequency resource is totally 23 subcarriers from the $0^{th}$ subcarrier to the $22^{nd}$ subcarrier, for one timeslot of one subframe, assuming that PRBs on which the first frequency resource is located are totally three PRBs from the $0^{th}$ PRB to the $2^{nd}$ PRB, and PRBs on which the second frequency resource is located are totally two PRBs from the $0^{th}$ PRB to the $1^{st}$ PRB, that is, the PRBs on which the overlapping frequency resource is located are the same as the PRBs on which the second frequency resource is located, in one timeslot of the subframe in the subframe set for sending the second information or sending the second information in an enhanced manner, the first information is sent in an enhanced manner on one PRB, other than the two PRBs on which the overlapping frequency resource is located, in the three PRBs on which the first frequency resource is located, that is, the first information is sent in an enhanced manner on the second PRB, and in terms of subcarrier, the first information is sent in an enhanced manner on totally 12 subcarriers from the $24^{th}$ subcarrier to the $35^{th}$ subcarrier. In other words, the first information is not sent in an enhanced manner on the PRB on which the overlapping frequency resource is located.

In actual application, a manner of sending the first information in an enhanced manner on the available PRB for the first information includes but is not limited to the following two sending manners.

In a first manner, the sending the first information in an enhanced manner on the available PRB for the first information includes: determining, according to a quantity of PRBs on which the first frequency resource is located, a quantity of all available bits for one transport block of the first information; selecting a sending bit of the transport block of the first information according to the quantity of all available bits for the transport block; and mapping a modulation symbol of the first information to a resource element (RE) included in the PRB on which the first frequency resource is located, and when a first RE in the RE is included in the PRB on which the overlapping frequency resource is located, discarding a modulation symbol corresponding to the first RE. The first sending manner may be also referred to as enhanced sending of the first information in a manner of puncturing the PRB on which the overlapping frequency resource is located.

In a second manner, the sending the first information in an enhanced manner on the available PRB for the first information includes: determining, according to a quantity of available PRBs for the first information, a quantity of all available bits for one transport block of the first information; selecting a sending bit of the transport block of the first information according to the quantity of all available bits for the transport block; and mapping a modulation symbol of the first information to a resource element RE included in the available PRB for the first information. The second sending manner may be also referred to as enhanced sending of the first information in a manner of performing rate matching on the PRB on which the overlapping frequency resource is located.

In the first manner and the second manner, assuming that the quantity of all available bits for the transport block of the first information is H, selecting the sending bit of the transport block of the first information according to the quantity H of all available bits for the transport block may be specifically as follows: 1. Calculate a quantity $E_r'$ of sending bits of one code block of one transport block of the first information according to H: if $r \le C-\gamma-1$, $E_r'=N_L \times Q_m \times \lfloor G'/C \rfloor$; otherwise, $E_r'=N_L \times Q_m \times \lceil '/C \rceil$, where r is a sequence number of the code block, C is a quantity of code blocks obtained by performing code block segmentation on the transport block, $\lfloor \rfloor$ indicates rounding down, $\lceil \rceil$ indicates rounding up, $\gamma=G'$ mod C, mod indicates a modulo operation, $G'=H/N_L \times Q_m$), $N_L=2$ when transmit diversity is used, and in another case, $N_L$ is equal to a quantity of layers to which the transport block is mapped, and $Q_m$ is an order corresponding to a modulation scheme. 2. Select the sending bit of the code block of the one transport block of the first information, where a quantity of selected bits is $E_r'$. 3. Cascade selected sending bits of multiple code blocks of the transport block of the first information to obtain the selected sending bit of the one transport block of the first information. The modulation symbol of the first information may be obtained by modulating the sending bit of the one transport block of the first information.

Further, in actual application, the first information may be specifically at least one of unicast data, a system information block (System Information Block, SIB), or a random access response (Random Access Response, RAR), and the second information is specifically a master information block (Master Information Block, MIB); or the first information is specifically a random access response RAR, and the second information is specifically a system information block SIB; or the first information is specifically a paging message, and the second information is specifically a system information block and/or a random access response RAR; or the first information is specifically unicast data, and the second information is specifically at least one of a system information block, a random access response RAR, or a paging message; or the first information is specifically first unicast data, and the second information is specifically second unicast data, where the first unicast data and the second unicast data are different unicast data.

The following separately describes a specific implementation process of the information transmission method in this embodiment by using several specific instances.

In a first implementation form, in this embodiment, for example, the first information is specifically at least one of unicast data, a system information block SIB, or a random access response RAR, and the second information is a master information block MIB.

In step 101 and step 102, the base station determines the first frequency resource used to send the first information in an enhanced manner, and determines the second frequency resource used to send the second information or send the second information in an enhanced manner. Specifically, the first frequency resource used to send the at least one of the unicast data, the SIB, or the RAR in an enhanced manner is determined according to scheduling of the base station, the DCI carried on the PDCCH is sent in an enhanced manner, and the UE is notified of the determined first frequency resource by means of the resource block allocation in the DCI; or the first frequency resource is determined in the predefined manner, and the first frequency resource is used for repeated sending of the at least one of the unicast data, the SIB, or the RAR in multiple subframes. The second frequency resource used to send the second information or send the second information in an enhanced manner is generally determined as middle 72 subcarriers in system bandwidth.

When there is an overlapping frequency resource between the first frequency resource and the second frequency resource, for example, when the first frequency resource includes at least one subcarrier in the middle 72 subcarriers in the system bandwidth, the at least one subcarrier is the overlapping frequency resource, and enhanced sending of the at least one of the unicast data, the SIB, or the RAR may conflict with enhanced sending of the MIB. Therefore, step 103 or step 104 is performed next.

In step 103, in a subframe for sending the MIB in an enhanced manner, the MIB is sent in an enhanced manner by using the second frequency resource, and in an available subframe for sending the at least one of the unicast data, the SIB, or the RAR in an enhanced manner, the at least one of the unicast data, the SIB, or the RAR is sent in an enhanced manner by using the first frequency resource, where the available subframe for sending the at least one of the unicast data, the SIB, or the RAR in an enhanced manner is one or more subframes other than a subframe in a subframe set for sending the MIB in an enhanced manner. In other words, the unicast data, the SIB, or the RAR is not sent in an enhanced manner in the subframe in the subframe set for sending the MIB in an enhanced manner.

Further, at least one subframe in the subframe set for sending the MIB in an enhanced manner is a subframe within duration for sending the at least one of the unicast data, the SIB, or the RAR in an enhanced manner. For enhanced sending of the SIB, the duration is equal to a change cycle of the SIB, and for enhanced sending of the unicast data or the RAR, the duration is duration between a start subframe for sending one transport block of the information in an enhanced manner and an end subframe for sending the transport block in an enhanced manner. That is, the duration for sending the at least one of the unicast data, the SIB, or the RAR in an enhanced manner includes the at least one subframe in the subframe set for sending the MIB in an enhanced manner, and in another subframe in all subframes included in the duration except the subframe in the subframe set for sending the MIB in an enhanced manner, the at least one of the unicast data, the SIB, or the RAR is sent in an enhanced manner by using the first frequency resource.

Figure 3:
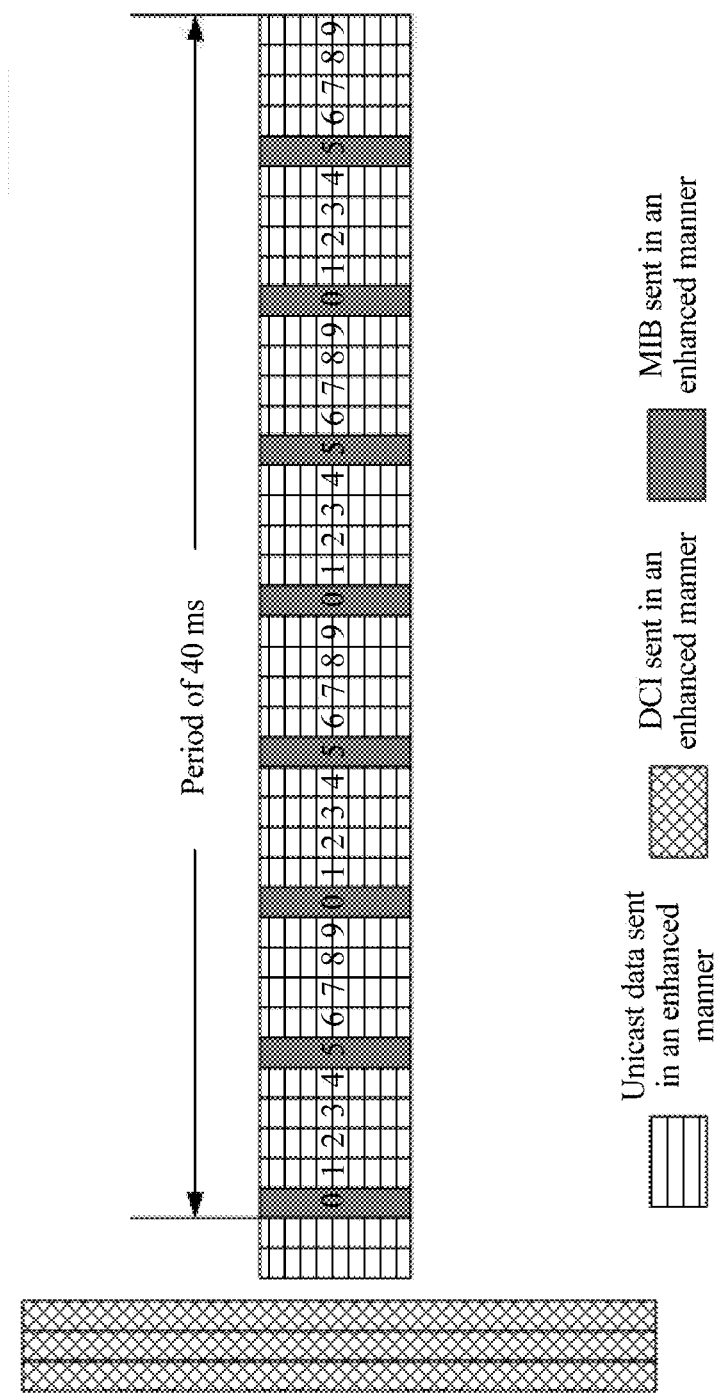
FIG. 3 and FIG. 4 are schematic diagrams of an information transmission method according to a first implementation form of this application.

The unicast data is used as an example. As shown in FIG. 3, if the MIB is sent in an enhanced manner in subframes 0 and subframes 5 in all radio frames in a period of 40 ms, the unicast data is scheduled by using the DCI carried on the PDCCH, and a frequency resource configured by means of the resource block allocation in the DCI is the middle 72 subcarriers in the system bandwidth, the unicast data is not sent in an enhanced manner in the subframes 0 and the subframes 5. That is, the unicast data is not sent in an enhanced manner by using the subframes for sending the MIB in an enhanced manner, but instead, the unicast data is sent in an enhanced manner in other subframes, than the subframes for sending the MIB in an enhanced manner, within duration for sending the unicast data in an enhanced manner.

For the method in step 104, in this embodiment, the following is specifically used as an example for description: In the subframe in the subframe set for sending the second information in an enhanced manner, the first information is sent in an enhanced manner on the available physical resource block PRB for the first information, where the available PRB for the first information is specifically the PRB, other than the PRB on which the overlapping frequency resource is located, in the PRB on which the first frequency resource is located.

Figure 4:
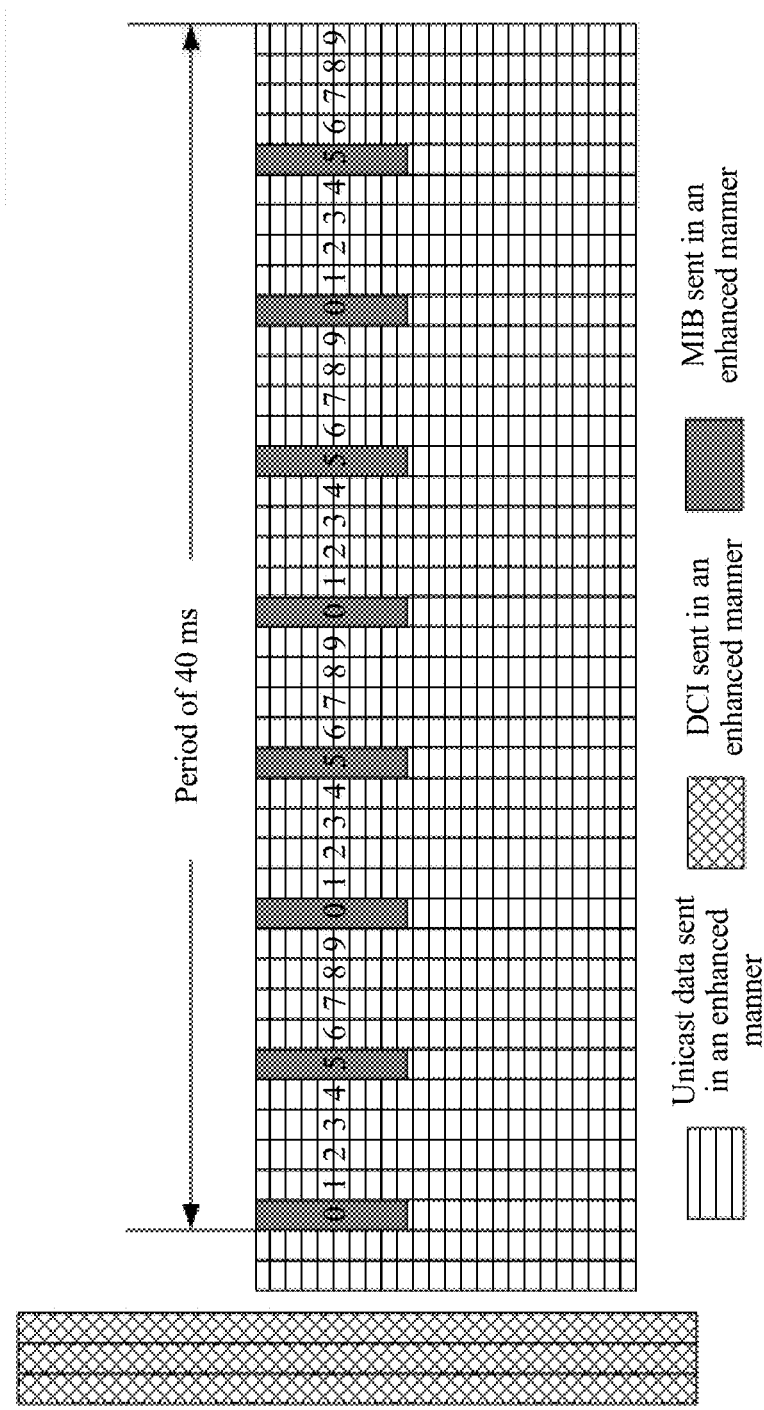

The unicast data is still used as an example. As shown in FIG. 4, if the MIB is sent in an enhanced manner in subframes 0 and subframes 5 in all radio frames in a period of 40 ms, PRBs on which the first frequency resource configured for the unicast data by means of the resource block allocation in the DCI is located include middle six PRBs in the system bandwidth, and PRBs on which the second frequency resource used to send the MIB in an enhanced manner is located are the middle six PRBs in the system bandwidth, in the subframes 0 and the subframes 5, the unicast data is sent in an enhanced manner on another PRB, than the middle six PRBs in the system bandwidth, in the PRBs on which the first frequency resource configured by means of the resource block allocation in the DCI is located, and in other subframes, than the subframes for sending the MIB in an enhanced manner, within duration for sending the unicast data in an enhanced manner, the unicast data is sent in an enhanced manner on the PRBs on which the first frequency resource is located.

There are specifically two manners in this embodiment.

In a first manner, in a subframe for sending the MIB in an enhanced manner, the at least one of the unicast data, the SIB, or the RAR is sent in an enhanced manner in a manner of puncturing the PRB on which the overlapping frequency resource is located.

The unicast data is used as an example. Sending, in the subframe for sending the MIB in an enhanced manner, the unicast data in an enhanced manner on an available physical resource block PRB for the unicast data specifically includes the following steps: A quantity of all available bits for one transport block of the unicast data is determined according to the quantity of PRBs on which the first frequency resource is located; a sending bit of the transport block of the unicast data is selected according to the quantity of all available bits for the transport block; and a modulation symbol of the unicast data is mapped to a resource element RE included in the PRB on which the first frequency resource is located, and when a first RE in the RE is included in the PRB on which the overlapping frequency resource is located, a modulation symbol corresponding to the first RE is discarded. One RE is defined as one symbol in time and one subcarrier in frequency. When the first RE in the RE is included in the middle six PRBs in the system bandwidth, the modulation symbol that is of the unicast data and mapped to the first RE is discarded.

In a second manner, in a subframe for sending the MIB in an enhanced manner, the at least one of the unicast data, the SIB, or the RAR is sent in an enhanced manner in a manner of performing rate matching on the PRB on which the overlapping frequency resource is located.

The unicast data is used as an example. Sending, in the subframe for sending the MIB in an enhanced manner, the unicast data in an enhanced manner on an available physical resource block PRB for the unicast data specifically includes the following steps: A quantity of all available bits for one transport block of the unicast data is determined according to a quantity of available PRBs for the unicast data; a sending bit of the transport block of the unicast data is selected according to the quantity of all available bits for the transport block; and a modulation symbol of the unicast data is mapped to a resource element RE included in the available PRB for the unicast data.

Further, as described in the background, there are three options: A, B, and C for which period of 40 ms in which the MIB is sent in an enhanced manner. In a case of the option B, the base station decides whether the MIB is sent in an enhanced manner in a period of 40 ms, and the base station may dynamically choose whether to send the MIB in an enhanced manner. From a perspective of the UE, the UE does not know whether the base station sends the MIB in an enhanced manner in a period of 40 ms, and therefore, does not know whether a frequency resource configured by means of the resource block allocation in the DCI or a predefined frequency resource conflicts with a frequency resource used to send the MIB in an enhanced manner. Therefore, when the base station sends the at least one of the SIB, the RAR, or the unicast data in an enhanced manner, it is assumed that the MIB is sent in an enhanced manner in all periods of 40 ms, that is, a subframe set for sending the MIB in an enhanced manner includes subframes that are in all radio frames and whose numbers are the same as that of the subframe for sending the MIB in an enhanced manner. As shown in FIG. 3 and FIG. 4, the subframe set for sending the MIB in an enhanced manner includes subframes 0 and subframes 5 in all the radio frames. This solution is also applied to the option A. In a case of the option C, if the UE can obtain a predefined pattern, the UE can know that the base station sends the MIB in an enhanced manner in which period of 40 ms and does not send the MIB in an enhanced manner in which period of 40 ms, and therefore, also know a period of 40 ms in which a frequency resource configured by means of the resource block allocation in the DCI or a predefined frequency resource conflicts with a frequency resource used to send the MIB in an enhanced manner. Therefore, when the base station sends the at least one of the SIB, the RAR, or the unicast data, it is also assumed, according to the predefined pattern, whether the MIB is sent in an enhanced manner in a period of 40 ms, that is, a subframe set for sending the MIB in an enhanced manner includes the subframe for sending the MIB in an enhanced manner. As shown in FIG. 3 and FIG. 4, the subframe set for sending the MIB in an enhanced manner includes subframes 0 and subframes 5 in radio frames in the period of 40 ms for sending the MIB in an enhanced manner.

In a second implementation form, in this embodiment, the first information is an RAR, and the second information is a SIB, where the SIB may be specifically a SIB1, a SIB2, . . . , or a SIB16 or may be a new SIB such as a SIB17 or a SIBm defined for UE in a basement or with poor channel quality.

In step 101 and step 102, the base station determines the first frequency resource used to send the first information in an enhanced manner, and determines the second frequency resource used to send the second information or send the second information in an enhanced manner. Specifically, the base station determines, according to scheduling of the base station, the first frequency resource used for the RAR and/or the second frequency resource used for the SIB, then sends or sends, in an enhanced manner, the DCI carried on the PDCCH, and notifies the UE of the determined first frequency resource and/or the determined second frequency resource by means of the resource block allocation in the DCI; or the base station determines, in the predefined manner, the first frequency resource used for the RAR and/or the second frequency resource used for the SIB. When there is an overlapping frequency between the first frequency resource used for the RAR and the second frequency resource used for the SIB, enhanced sending of the RAR may conflict with sending or enhanced sending of the SIB. Therefore, the base station performs step 103 or step 104 next.

In step 103, in an available subframe for sending the RAR in an enhanced manner, the RAR is sent in an enhanced manner by using the first frequency resource, where the available subframe for sending the RAR in an enhanced manner is one or more subframes other than a subframe in a subframe set for sending the SIB or sending the SIB in an enhanced manner. In other words, the RAR is not sent in an enhanced manner in the subframe in the subframe set for sending the SIB or sending the SIB in an enhanced manner. The subframe set for sending the SIB or sending the SIB in an enhanced manner includes a subframe for sending the SIB or sending the SIB in an enhanced manner. Further, at least one subframe in the subframe set for sending the SIB or sending the SIB in an enhanced manner is a subframe within duration for sending the RAR in an enhanced manner. The duration is duration between a start subframe for sending one transport block of the RAR in an enhanced manner and an end subframe for sending the transport block in an enhanced manner. That is, the duration for sending the RAR in an enhanced manner includes the subframe for sending the SIB or sending the SIB in an enhanced manner, and in another subframe in all subframes included in the duration except the subframe for sending the SIB or sending the SIB in an enhanced manner, the RAR is sent in an enhanced manner by using the first frequency resource.

Figure 5:
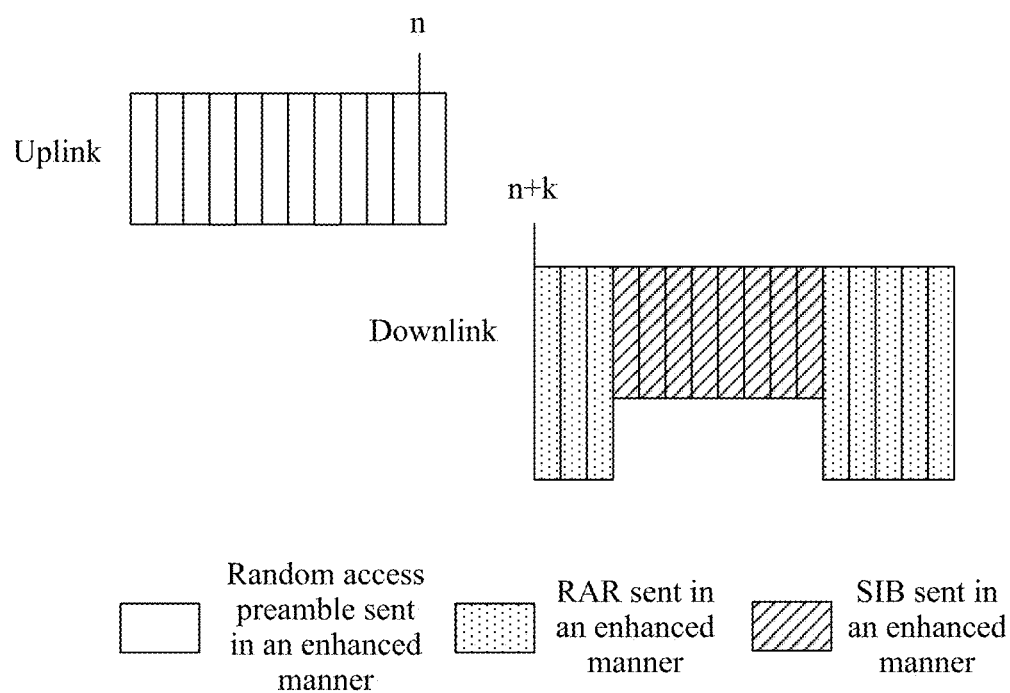
FIG. 5 is a schematic diagram of an information transmission method according to a second implementation form of this application.

As shown in FIG. 5, predefined frequency resources are used for enhanced sending of the RAR and the SIB in multiple subframes, and a frequency resource predefined for the RAR includes a frequency resource predefined for the SIB. Assuming that a moment n is a start moment of the last subframe in which the UE sends a random access preamble in a random access process, the base station starts to send the RAR to the UE in a subframe whose start moment is n+k, and N subframes are required to send the RAR in an enhanced manner. If some subframes in N consecutive subframes starting from the moment n+k are subframes for sending the SIB in an enhanced manner, the RAR is not sent in an enhanced manner in the subframes for sending the SIB in an enhanced manner; instead, the RAR is sent in an enhanced manner in subframes following the N consecutive subframes, and enhanced sending of the RAR is not completed until a quantity of subframes for sending the RAR in an enhanced manner reaches N, where k and N are positive integers.

In step 104, for sending, in a subframe for sending the SIB or sending the SIB in an enhanced manner, the RAR in an enhanced manner on the frequency resource other than the overlapping frequency resource in the first frequency resource, the following is specifically used as an example for description: In the subframe for sending the SIB or sending the SIB in an enhanced manner, the RAR is sent in an enhanced manner on an available physical resource block PRB for the RAR, where the available PRB for the RAR is specifically a PRB, other than the PRB on which the overlapping frequency resource is located, in the PRB on which the first frequency resource is located.

Specifically, for example, predefined PRBs are used for enhanced sending of the RAR and the SIB in multiple subframes, and a PRB predefined for the RAR includes one or more PRBs predefined for the SIB. Assuming that a moment n is a start moment of the last subframe in which the UE sends a random access preamble in a random access process, the base station starts to send the RAR to the UE in a subframe whose start moment is n+k, and M subframes are required to send the RAR in an enhanced manner. If some subframes in M consecutive subframes starting from the moment n+k are subframes for sending the SIB, in the subframes for sending the SIB in an enhanced manner, the RAR is sent in an enhanced manner only on another PRB, than the PRB predefined for the SIB, in the PRB predefined for the RAR, and in another subframe, the RAR is sent in an enhanced manner on the PRB predefined for the RAR, where k and M are positive integers.

In this embodiment, in the subframe for sending the SIB or sending the SIB in an enhanced manner, the RAR is sent in an enhanced manner on the available physical resource block PRB for the RAR, and the RAR may be sent in an enhanced manner in a manner of puncturing the PRB on which the overlapping frequency resource is located or performing rate matching on the PRB on which the overlapping frequency resource is located, where steps specifically included in the manner of puncturing or performing rate matching are similar to the descriptions of step 104 in the first implementation form.

In a third implementation form, in this embodiment, the first information is a paging message, and the second information is a SIB and/or an RAR, where the SIB may be a SIB1, a SIB2, . . . , or a SIB16 or may be a new SIB such as a SIB17 or a SIBm defined for UE in a basement or with poor channel quality.

In step 101 and step 102, the base station determines the first frequency resource used to send the paging message in an enhanced manner, and determines the second frequency resource used to send or send, in an enhanced manner, the SIB and/or the RAR. Specifically, the base station determines the first frequency resource and/or the second frequency resource according to scheduling of the base station, then sends or sends, in an enhanced manner, the DCI carried on the PDCCH, and notifies the UE of the determined first frequency resource and/or the determined second frequency resource by means of the resource block allocation in the DCI; or the base station determines the first frequency resource and/or the second frequency resource in the predefined manner. The determined frequency resources are used for enhanced sending of the paging message, the SIB, or the RAR in multiple subframes. When there is an overlapping frequency resource between the first frequency resource used for the paging message and the second frequency resource used for the RAR and/or the SIB, enhanced sending of the paging message may conflict with sending or enhanced sending of the RAR and/or the SIB. Therefore, step 103 or step 104 is performed.

In step 103, in an available subframe for sending the paging message in an enhanced manner, the paging message is sent in an enhanced manner by using the first frequency resource, where the available subframe for sending the paging message in an enhanced manner is one or more subframes other than a subframe in a subframe set for sending the SIB and/or the RAR or sending the SIB and/or the RAR in an enhanced manner. In other words, the paging message is not sent in an enhanced manner in the subframe in the subframe set for sending or sending, in an enhanced manner, the SIB and/or the RAR. The subframe set for sending or sending, in an enhanced manner, the SIB and/or the RAR includes a subframe for sending or sending, in an enhanced manner, the SIB and/or the RAR.

Figure 6:
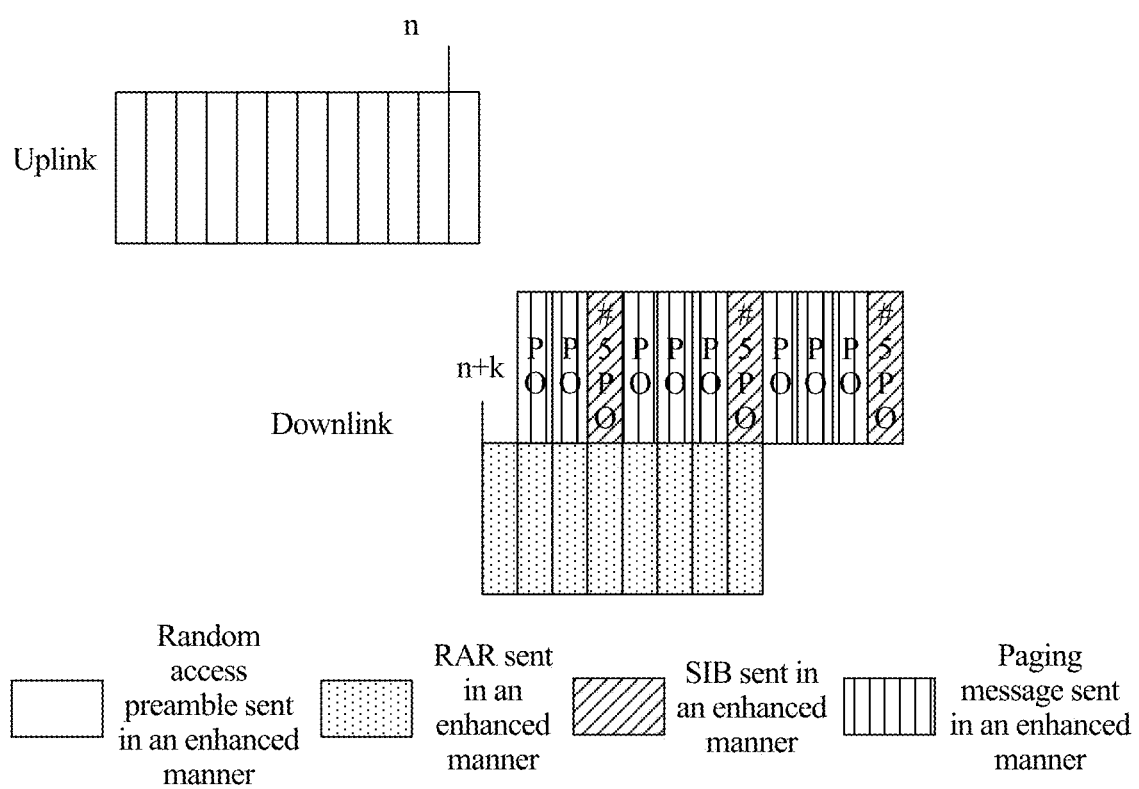
FIG. 6 is a schematic diagram of an information transmission method according to a third implementation form of this application.

As shown in FIG. 6, it is assumed that a moment n is a start moment of the last subframe in which the UE sends a random access preamble in a random access process, the base station starts to send the RAR to the UE in an enhanced manner in a subframe whose start moment is n+k, the SIB is sent in an enhanced manner only in a subframe 5, and a calculated PO includes the subframe for sending the RAR and/or the SIB in an enhanced manner. Predefined frequency resources are used for enhanced sending of the paging message, the RAR, and the SIB in multiple subframes, and a frequency resource predefined for the paging message is completely the same as a frequency resource predefined for the SIB, and is different from a frequency resource predefined for the RAR. When the PO is the subframe 5 for sending the SIB in an enhanced manner, the paging message is not sent in an enhanced manner, and in another subframe in the PO, the paging message is sent in an enhanced manner, where n and k are positive integers.

Alternatively, a formula for calculating a PF and a PO for sending the paging message in an enhanced manner needs to meet: both a calculated PF and a calculated PO are not the same as a subframe and a radio frame for sending or sending, in an enhanced manner, the SIB, and/or both a calculated PF and a calculated PO are not the same as a subframe and a radio frame for sending or sending, in an enhanced manner, the RAR.

In step 104, for example, sending, in a subframe for sending the SIB and/or the RAR or sending the SIB and/or the RAR in an enhanced manner, the paging message in an enhanced manner on the frequency resource other than the overlapping frequency resource in the first frequency resource specifically includes: in the subframe for sending the SIB and/or the RAR or sending the SIB and/or the RAR in an enhanced manner, sending the paging message in an enhanced manner on an available physical resource block PRB for paging, where the available PRB for the paging message is specifically a PRB, other than the PRB on which the overlapping frequency resource is located, in the PRB on which the first frequency resource is located.

Specifically, for example, it is assumed that a moment n is a start moment of the last subframe in which the UE sends a random access preamble in a random access process, the base station starts to send the RAR to the UE in an enhanced manner in a subframe whose start moment is n+k, the SIB is sent in an enhanced manner only in a subframe 5, and a calculated PO includes a subframe for sending the RAR and/or the SIB in an enhanced manner. Predefined PRBs are used for enhanced sending of the paging message, the RAR, and the SIB in multiple subframes, and a PRB predefined for the paging message includes a PRB predefined for the SIB, and does not include a PRB predefined for the RAR. When the PO is the subframe 5 for sending the SIB in an enhanced manner, the paging message is sent in an enhanced manner only on another PRB, than the PRB predefined for the SIB, in the PRB predefined for the paging message, and in another subframe in the PO, the paging message is sent in an enhanced manner on the PRB predefined for the paging message.

In this embodiment, in the subframe for sending the SIB and/or the RAR or sending the SIB and/or the RAR in an enhanced manner, the paging message is sent in an enhanced manner on the available physical resource block PRB for the paging message, and the paging message may be sent in an enhanced manner in a manner of puncturing the PRB on which the overlapping frequency resource is located or performing rate matching on the PRB on which the overlapping frequency resource is located, where steps specifically included in the manner of puncturing or performing rate matching are similar to the descriptions of step 104 in the first implementation form.

In a fourth implementation form, in this embodiment, the first information is unicast data, and the second information is at least one of a SIB, an RAR, or a paging message. The SIB may be a SIB1, a SIB2, . . . , or a SIB16 or may be a new SIB such as a SIB17 or a SIBm defined for UE in a basement or with poor channel quality.

Step 101 and step 102 are performed to determine the first frequency resource used to send the unicast data in an enhanced manner, and determine the second frequency resource used to send or send, in an enhanced manner, the at least one of the SIB, the RAR, or the paging message. Specifically, the base station determines, according to scheduling of the base station, the first frequency resource used for the unicast data, sends, in an enhanced manner, the DCI carried on the PDCCH, and notifies the UE of the determined first frequency resource by means of the resource block allocation in the DCI. The first frequency resource configured by means of the resource block allocation in the DCI is used for enhanced sending of the unicast data in multiple subframes. The base station determines, according to scheduling of the base station, the second frequency resource used for the paging message, the SIB, or the RAR, sends or sends, in an enhanced manner, the DCI carried on the PDCCH, and notifies the UE of the determined second frequency resource by means of the resource block allocation in the DCI; or the base station determines the second frequency resource in the predefined manner, and the second frequency resource is used for enhanced sending of the paging message, the SIB, or the RAR in multiple subframes.

When there is an overlapping frequency resource between the first frequency resource for the unicast data and the second frequency resource for the at least one of the paging message, the RAR, or the SIB, the first frequency resource used to send the unicast data in an enhanced manner may conflict with the at least one of the paging message, the RAR, or the SIB to be sent or sent in an enhanced manner. In this case, step 103 or step 104 is performed.

In step 103, in an available subframe for sending the unicast data in an enhanced manner, the unicast data is sent in an enhanced manner by using the first frequency resource, where the available subframe for sending the unicast data in an enhanced manner is one or more subframes other than a subframe in a subframe set for sending the at least one of the paging message, the RAR, or the SIB or sending the at least one of the paging message, the RAR, or the SIB in an enhanced manner. In other words, the unicast data is not sent in an enhanced manner in a subframe for sending or sending, in an enhanced manner, the at least one of the SIB, the RAR, or the paging message. The subframe set for sending or sending, in an enhanced manner, the at least one of the SIB, the RAR, or the paging message includes the subframe for sending or sending, in an enhanced manner, the at least one of the SIB, the RAR, or the paging message. Further, at least one subframe in the subframe set for sending or sending, in an enhanced manner, the SIB, the RAR, or the paging message is a subframe within duration for sending the unicast data in an enhanced manner. The duration is duration between a start subframe for sending one transport block of the unicast data in an enhanced manner and an end subframe for sending the transport block in an enhanced manner. That is, the duration for sending the unicast data in an enhanced manner includes at least one of the subframe for sending or sending, in an enhanced manner, the at least one of the SIB, the RAR, or the paging message, and in another subframe in all subframes included in the duration except the subframe for sending or sending, in an enhanced manner, the at least one of the SIB, the RAR, or the paging message, the unicast data is sent in an enhanced manner by using the first frequency resource.

Figure 7:
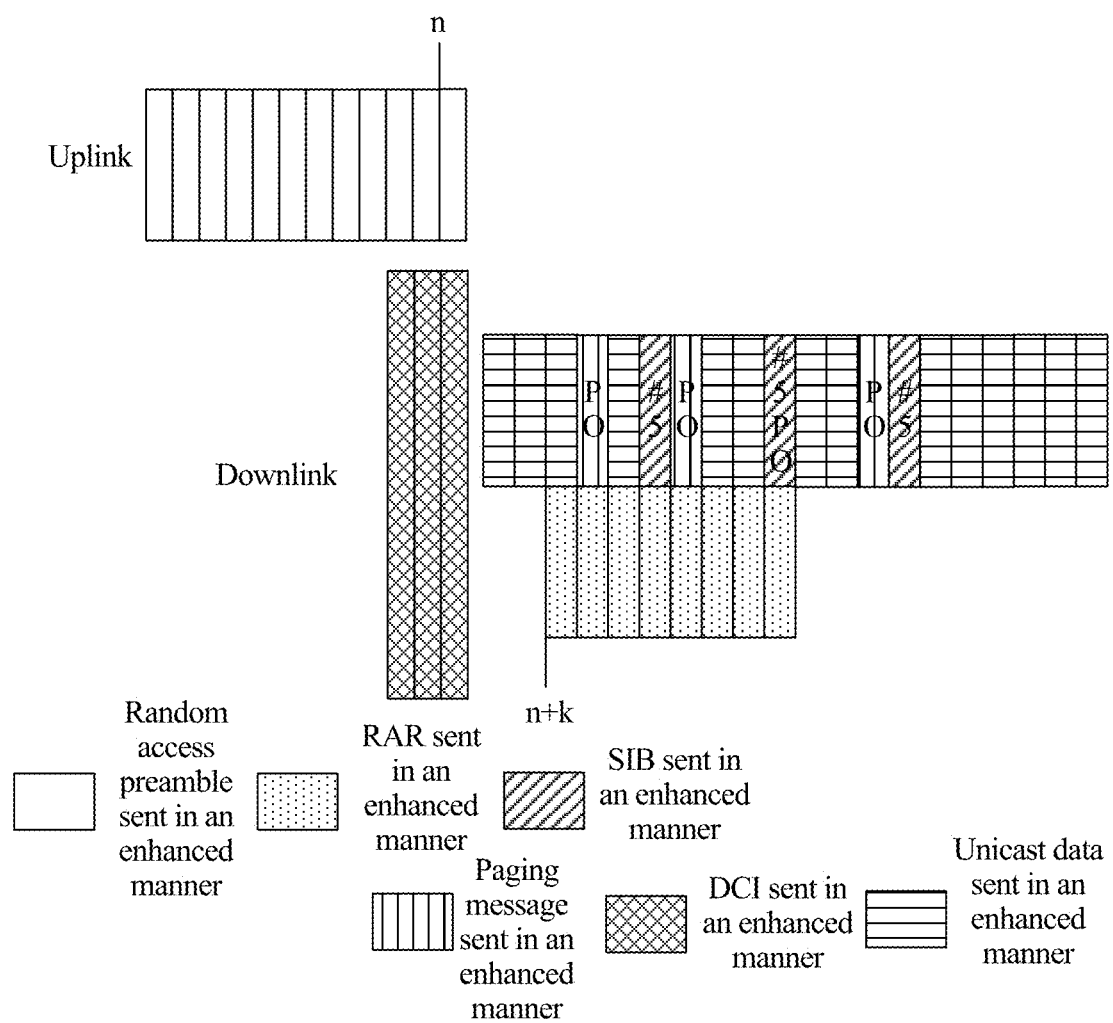
FIG. 7 is a schematic diagram of an information transmission method according to a fourth implementation form of this application.

Specifically referring to FIG. 7, it is assumed that a moment n is a start moment of the last subframe in which the UE sends a random access preamble in a random access process, the base station starts to send the RAR to the UE in an enhanced manner in a subframe whose start moment is n+k, the SIB is sent in an enhanced manner only in a subframe 5, and a calculated PO is indicated in FIG. 7. Predefined frequency resources are used for enhanced sending of the paging message, the RAR, and the SIB in multiple subframes, a frequency resource predefined for the paging message is completely the same as a frequency resource predefined for the SIB, and another frequency resource is predefined for the RAR. A frequency resource configured by means of the resource block allocation in the DCI is used for enhanced sending of the unicast data, and the frequency resource configured by means of the resource block allocation in the DCI is completely the same as the frequency resource predefined for the paging message and the SIB. The unicast data is not sent in an enhanced manner in the subframe 5 for sending the SIB in an enhanced manner and a subframe in which the PO is located, and the unicast data is sent in an enhanced manner in another subframe.

For example, the method in step 104 is specifically: in a subframe in a subframe set for sending the at least one of the paging message, the RAR, or the SIB or sending the at least one of the paging message, the RAR, or the SIB in an enhanced manner, sending the unicast data in an enhanced manner on an available physical resource block PRB for the unicast data, where the available PRB for the unicast data is a PRB, other than the PRB on which the overlapping frequency resource is located, in the PRB on which the first frequency resource is located.

Specifically, for example, it is assumed that a moment n is a start moment of the last subframe in which the UE sends a random access preamble in a random access process, the base station starts to send the RAR to the UE in an enhanced manner in a subframe whose start moment is n+k, and the SIB is sent in an enhanced manner only in a subframe 5. Predefined PRBs are used for enhanced sending of the paging message, the RAR, and the SIB in multiple subframes, a PRB predefined for the paging message is completely the same as a PRB predefined for the SIB, and another PRB is predefined for the RAR. A PRB configured by means of the resource block allocation in the DCI is used for enhanced sending of the unicast data, and the PRB configured by means of the resource block allocation in the DCI includes the PRB predefined for the paging message and the SIB, and does not include the PRB predefined for the RAR. In the subframe 5 for sending the SIB in an enhanced manner and a subframe in which the PO is located, the unicast data is sent in an enhanced manner only on another PRB, than the PRB predefined for the SIB and the paging message, in the PRB configured by means of the resource block allocation in the DCI, and in another subframe for sending the unicast data in an enhanced manner, the unicast data is sent on the PRB configured by means of the resource block allocation in the DCI.

In this embodiment, in the subframe in the subframe set for sending the at least one of the paging message, the RAR, or the SIB or sending the at least one of the paging message, the RAR, or the SIB in an enhanced manner, the unicast data is sent in an enhanced manner on the available physical resource block PRB for the unicast data, and the unicast data may be sent in an enhanced manner in a manner of puncturing the PRB on which the overlapping frequency resource is located or performing rate matching on the PRB on which the overlapping frequency resource is located, where steps specifically included in the manner of puncturing or performing rate matching are similar to the descriptions of step 104 in the first implementation form.

In a fifth implementation form, in this embodiment, the first information is first unicast data, and the second information is second unicast data, where the first unicast data and the second unicast data are different unicast data. For example, the first unicast data and the second unicast data are unicast data for different UE.

Step 101 and step 102 are performed to determine the first frequency resource used to send the first unicast data in an enhanced manner, and determine the second frequency resource used to send or send, in an enhanced manner, the second unicast data. Specifically, the base station determines, according to scheduling of the base station, the first frequency resource used for the first unicast data and the second frequency resource used for the second unicast data, sends or sends, in an enhanced manner, the DCI carried on the PDCCH, and notifies the UE of the determined first frequency resource and the determined second frequency resource by means of the resource block allocation in the DCI. The first frequency resource configured by means of the resource block allocation in the DCI is used for enhanced sending of the first unicast data in multiple subframes. When there is an overlapping frequency resource between the first frequency resource for the first unicast data and the second frequency resource for the second unicast data, enhanced sending of the first unicast data may conflict with sending or enhanced sending of the second unicast data. In this case, step 103 or step 104 is performed.

In step 103, in an available subframe for sending the first unicast data in an enhanced manner, the first unicast data is sent in an enhanced manner by using the first frequency resource, where the available subframe for sending the first unicast data in an enhanced manner is one or more subframes other than a subframe in a subframe set for sending or sending, in an enhanced manner, the second unicast data. In other words, the first unicast data is not sent in an enhanced manner in the subframe in the subframe set for sending or sending, in an enhanced manner, the second unicast data. The subframe set for sending or sending, in an enhanced manner, the second unicast data includes a subframe for sending or sending, in an enhanced manner, the second unicast data. Further, at least one subframe in the subframe set for sending or sending, in an enhanced manner, the second unicast data is a subframe within duration for sending the first unicast data in an enhanced manner. The duration is duration between a start subframe for sending one transport block of the first unicast data in an enhanced manner and an end subframe for sending the transport block in an enhanced manner. That is, the duration for sending the first unicast data in an enhanced manner includes at least one of the subframe for sending or sending, in an enhanced manner, the second unicast data, and in another subframe in all subframes included in the duration except the subframe for sending or sending, in an enhanced manner, the second unicast data, the first unicast data is sent in an enhanced manner by using the first frequency resource.

Figure 8:
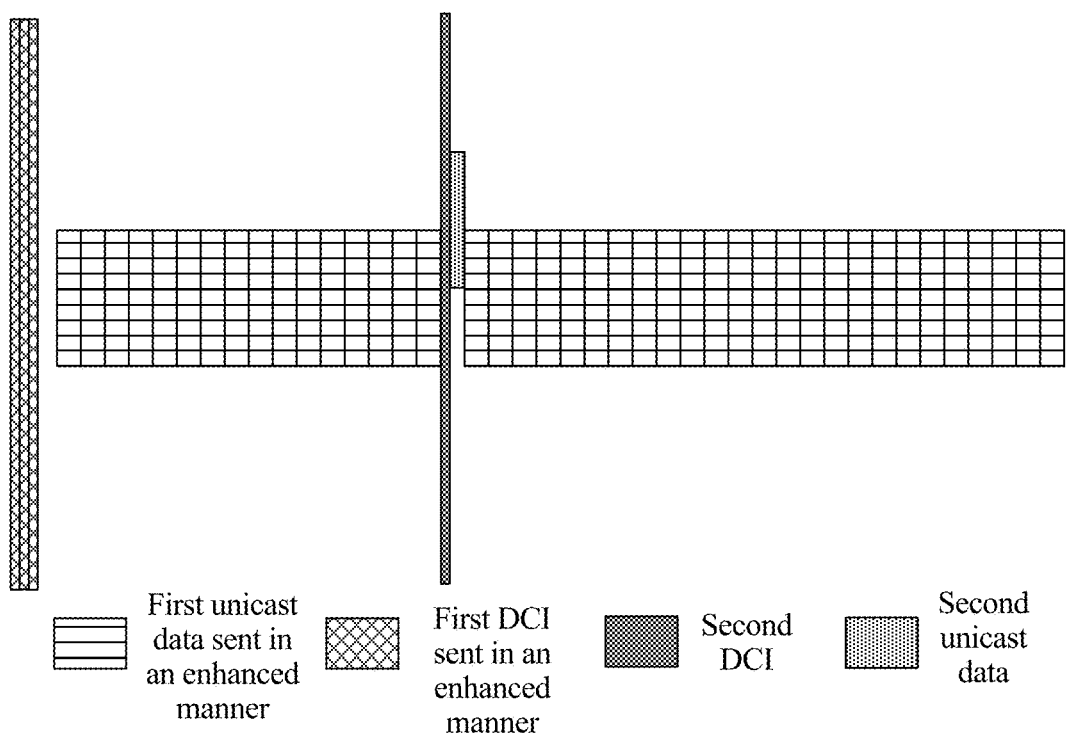
FIG. 8 is a schematic diagram of an information transmission method according to a fifth implementation form of this application.

Specifically referring to FIG. 8, the first unicast data is to be sent to UE in a basement or with poor channel quality, and a frequency resource configured by means of resource block allocation in first DCI is used for enhanced sending of the first unicast data in multiple subframes; and the second unicast data is to be sent to UE with good channel quality and is sent only in one subframe, and a frequency resource configured by means of resource block allocation in second DCI is used. There is an overlapping frequency resource between the first frequency resource used for the first unicast data and the second frequency resource used for the second unicast data, and duration for sending the first unicast data includes the subframe for sending the second unicast data. The first unicast data is not sent in an enhanced manner in the subframe for sending the second unicast data, and the first unicast data is sent in an enhanced manner in another subframe.

In the method in step 104, in a subframe for sending or sending, in an enhanced manner, the second unicast data, the first unicast data is sent in an enhanced manner on the frequency resource other than the overlapping frequency resource in the first frequency resource, which may be further specifically: in the subframe for sending or sending, in an enhanced manner, the second unicast data, sending the first unicast data in an enhanced manner on an available physical resource block PRB for the first unicast data, where the available PRB for the first unicast data is a PRB, other than the PRB on which the overlapping frequency resource is located, in the PRB on which the first frequency resource is located.

Specifically, for example, the first unicast data is to be sent to UE in a basement or with poor channel quality, and a frequency resource configured by means of resource block allocation in first DCI is used for enhanced sending of the first unicast data in multiple subframes; the second unicast data is to be sent to UE with good channel quality and is sent only in one subframe, and a frequency resource configured by means of resource block allocation in second DCI is used. There is an overlapping frequency resource between the frequency resource used for the first unicast data and the frequency resource used for the second unicast data. When a subframe for sending the first unicast data in an enhanced manner is also a subframe for sending the second unicast data, the first unicast data is sent in an enhanced manner only on another PRB, than a PRB configured for the second unicast data, in a PRB configured by means of the resource block allocation in the first DCI, and in another subframe for sending the first unicast data in an enhanced manner, the first unicast data is sent on the PRB configured by means of the resource block allocation in the first DCI.

In this embodiment, in the subframe for sending or sending, in an enhanced manner, the second unicast data, the first unicast data is sent in an enhanced manner on the available physical resource block PRB for the first unicast data, and the first unicast data may be sent in an enhanced manner in a manner of puncturing the PRB on which the overlapping frequency resource is located or performing rate matching on the PRB on which the overlapping frequency resource is located, where steps specifically included in the manner of puncturing or performing rate matching are similar to the descriptions of step 104 in the first implementation form.

With reference to the foregoing embodiments, when the first information or the second information is another system information block than a type-1 SIB, for example, a type of the SIB is specifically at least one of a SIB2, . . . , a SIB16, or a type of a new SIB such as a SIB17 or a SIBm defined for UE in a basement or with poor channel quality, the base station determines the first frequency resource or the second frequency resource according to scheduling of the base station. The method further includes: sending or sending, in an enhanced manner, the type-1 system information block, where the type-1 system information block includes configuration information of the first frequency resource or the second frequency resource. A frequency resource configured by the base station is used for enhanced sending of a SIB in multiple subframes.

The base station includes the configuration information of the first frequency resource or the second frequency resource in the to-be-sent SIB1, where the configuration information is specifically an information element (Information Element, IE) for resource block allocation or resource configuration. The UE may obtain the IE by receiving the SIB1, so that a frequency resource used for at least one of another system information block one or more other subframes than a subframe in the type-1 SIB is determined by using the IE, and the at least one of the another system information block than the type-1 SIB is received or received in an enhanced manner on the determined frequency resource.

Figure 9:
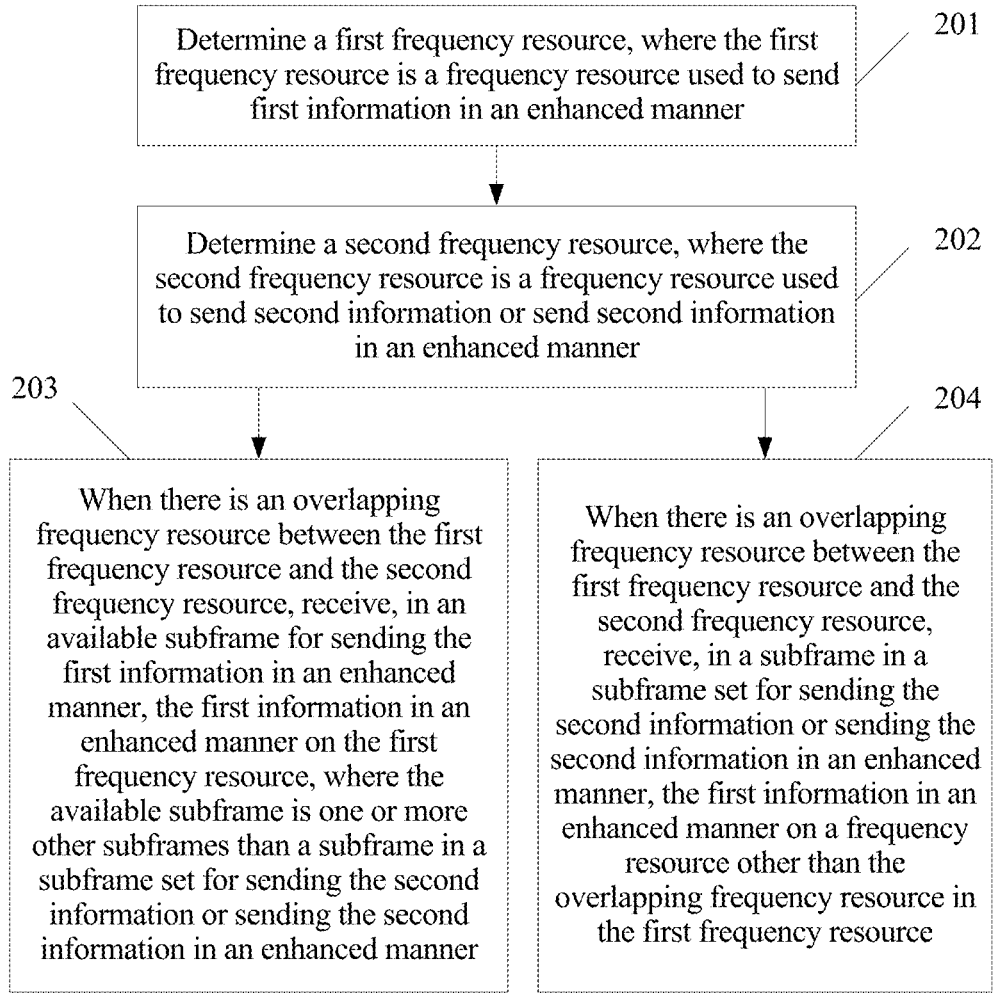
FIG. 9 is a schematic flowchart of an information transmission method on a user equipment side according to an embodiment of this application.

The method procedure shown in FIG. 2 is described from a base station side. Further referring to FIG. 9, FIG. 9 is a method flowchart of an information transmission method on a user equipment side in this embodiment. Referring to FIG. 9, the method includes:

Step 201: Determine a first frequency resource, where the first frequency resource is a frequency resource used to send first information in an enhanced manner.

Step 202: Determine a second frequency resource, where the second frequency resource is a frequency resource used to send second information or send second information in an enhanced manner.

When there is an overlapping frequency resource between the first frequency resource and the second frequency resource, step 203 or step 204 is performed.

Step 203: Receive, in an available subframe for sending the first information in an enhanced manner, the first information in an enhanced manner on the first frequency resource, where the available subframe is one or more subframes other than a subframe in a subframe set for sending the second information or sending the second information in an enhanced manner.

Step 204: Receive, in a subframe in a subframe set for sending the second information or sending the second information in an enhanced manner, the first information in an enhanced manner on a frequency resource other than the overlapping frequency resource in the first frequency resource.

Step 201 and step 202 may be performed at the same time or may be performed sequentially. Further, manners of determining the first frequency resource and the second frequency resource in step 201 and step 202 may be the same or may be different, and are generally corresponding to manners in which a base station determines the first frequency resource and the second frequency resource in step 101 and step 102. For example, a possible implementation manner is as follows: UE receives or receives, in an enhanced manner, DCI carried on a PDCCH, and determines the first frequency resource and/or the second frequency resource by means of resource block allocation in the DCI; or UE determines the first frequency resource and/or the second frequency resource in a predefined manner, where the predefined manner may be protocol agreement; or when the first information or the second information is another system information block than a type-1 system information block, the first frequency resource is determined or the second frequency resource is determined. Another possible implementation manner is specifically as follows: A type-1 system information block is received or received in an enhanced manner, and the first frequency resource or the second frequency resource is determined according to configuration information included in the type-1 system information block.

When the first frequency resource and the second frequency resource overlap, the UE receives the first information in a manner in step 203 or receives the first information in a manner in step 204. A receiving manner in step 203 is corresponding to a sending manner in step 103, and a receiving manner in step 204 is corresponding to a sending manner in step 104. Specifically, a to-be-used receiving manner depends on a sending manner used by the base station. Generally, the both sides: the UE and the base station may agree on a sending manner and a receiving manner in advance. When a communications system runs, data transmission is performed in the sending manner and the receiving manner that are agreed on. In another embodiment, specifically, the base station may notify the UE of a sending manner used by the base station, which may be performed each time or may be performed when the sending manner changes. For example, agreement on the sending manner and the receiving manner in advance may be protocol agreement. The receiving the first information in an enhanced manner includes receiving the first information in multiple subframes.

Optionally, corresponding to the sending, in the subframe in the subframe set for sending the second information or sending the second information in an enhanced manner, the first information in an enhanced manner on an available physical resource block PRB for the first information, where the available PRB for the first information is specifically a PRB, other than a PRB on which the overlapping frequency resource is located, in PRBs on which the first frequency resource is located, step 204 is specifically: receiving, in the subframe in the subframe set for sending the second information or sending the second information in an enhanced manner, the first information in an enhanced manner on an available physical resource block PRB for the first information, where the available PRB for the first information is specifically a PRB, other than the PRB on which the overlapping frequency resource is located, in the PRB on which the first frequency resource is located.

Further, in the subframe in the subframe set for sending the second information or sending the second information in an enhanced manner, at least one subframe is a subframe within duration for sending the first information in an enhanced manner, and the duration is a period for sending the first information in an enhanced manner or duration between a start subframe for sending the first information in an enhanced manner and an end subframe for sending the first information in an enhanced manner.

In actual application, the first information is specifically at least one of unicast data, a system information block, or a random access response RAR, and the second information is specifically a master information block.

Further, the subframe set for sending the second information or sending the second information in an enhanced manner includes subframes, whose numbers are the same as that of a subframe for sending the second information or sending the second information in an enhanced manner, in all radio frames; or the subframe set for sending the second information or sending the second information in an enhanced manner includes a subframe for sending the second information or sending the second information in an enhanced manner.

In another embodiment, the first information is specifically a random access response RAR, and the second information is specifically a system information block; or the first information is specifically a paging message, and the second information is specifically a system information block and/or a random access response RAR; or the first information is specifically unicast data, and the second information is specifically at least one of a system information block, a random access response RAR, or a paging message; or the first information is specifically first unicast data, and the second information is specifically second unicast data, where the first unicast data and the second unicast data are different unicast data.

For a specific example of each type of information, refer to the foregoing descriptions on a base station side. For brevity of this specification, details of corresponding receiving in this embodiment are not described herein.

Embodiment 2

Figure 10:
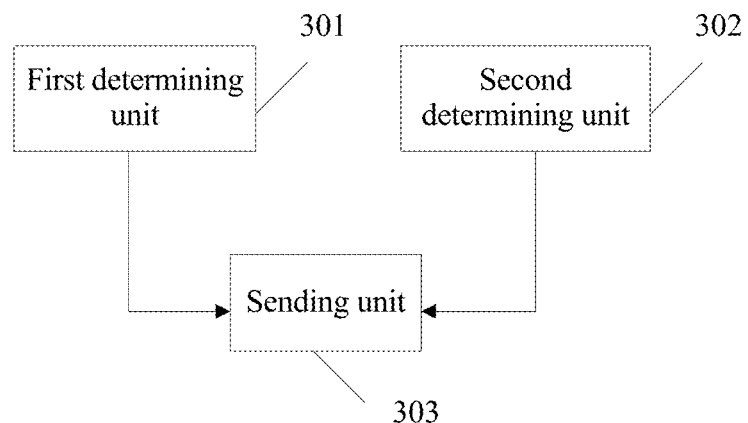
FIG. 10 is a functional block diagram of a base station according to Embodiment 2 of this application.

In an embodiment of this application, a base station is further provided. Referring to FIG. 10, FIG. 10 is a functional block diagram of the base station in this embodiment. The base station includes: a first determining unit 301, configured to determine a first frequency resource, where the first frequency resource is a frequency resource used to send first information in an enhanced manner; a second determining unit 302, configured to determine a second frequency resource, where the second frequency resource is a frequency resource used to send second information or send second information in an enhanced manner; and a sending unit 303, configured to: when there is an overlapping frequency resource between the first frequency resource and the second frequency resource, send, in an available subframe for sending the first information in an enhanced manner, the first information in an enhanced manner by using the first frequency resource, where the available subframe is one or more subframes other than a subframe in a subframe set for sending the second information or sending the second information in an enhanced manner; or send, in a subframe in a subframe set for sending the second information or sending the second information in an enhanced manner, the first information in an enhanced manner on a frequency resource other than the overlapping frequency resource in the first frequency resource.

Further, the sending unit 303 is specifically configured to send, in the subframe in the subframe set for sending the second information or sending the second information in an enhanced manner, the first information in an enhanced manner on an available physical resource block PRB for the first information, where the available PRB for the first information is specifically a PRB, other than a PRB on which the overlapping frequency resource is located, in PRBs on which the first frequency resource is located.

Further, in an embodiment, the sending unit 303 is specifically configured to: determine, according to a quantity of PRBs on which the first frequency resource is located, a quantity of all available bits for one transport block of the first information; select a sending bit of the transport block of the first information according to the quantity of all available bits; and map a modulation symbol of the first information to a resource element RE included in the PRB on which the first frequency resource is located, and when a first RE in the RE is included in the PRB on which the overlapping frequency resource is located, discard a modulation symbol corresponding to the first RE.

Further, in another embodiment, the sending unit 303 is specifically configured to: determine, according to a quantity of available PRBs for the first information, a quantity of all available bits for one transport block of the first information; select a sending bit of the transport block of the first information according to the quantity of all available bits; and map a modulation symbol of the first information to a resource element RE included in the available PRB for the first information.

In a further embodiment, in the subframe in the subframe set for sending the second information or sending the second information in an enhanced manner, at least one subframe is a subframe within duration for sending the first information in an enhanced manner, and the duration is a period for sending the first information in an enhanced manner or duration between a start subframe for sending the first information in an enhanced manner and an end subframe for sending the first information in an enhanced manner.

With reference to the foregoing embodiments, the first information is specifically at least one of unicast data, a system information block, or a random access response RAR, and the second information is specifically a master information block.

Further, the subframe set for sending the second information or sending the second information in an enhanced manner includes subframes, whose numbers are the same as that of a subframe for sending the second information or sending the second information in an enhanced manner, in all radio frames; or the subframe set for sending the second information or sending the second information in an enhanced manner includes a subframe for sending the second information or sending the second information in an enhanced manner.

In another embodiment, the first information is specifically a random access response RAR, and the second information is specifically a system information block; or the first information is specifically a paging message, and the second information is specifically a system information block and/or a random access response RAR; or the first information is specifically unicast data, and the second information is specifically at least one of a system information block, a random access response RAR, or a paging message; or the first information is specifically first unicast data, and the second information is specifically second unicast data, where the first unicast data and the second unicast data are different unicast data.

With reference to the foregoing embodiments, when the first information or the second information is another system information block than a type-1 system information block, the sending unit 303 is further configured to send or send, in an enhanced manner, the type-1 system information block, where the type-1 system information block includes configuration information of the first frequency resource or the second frequency resource.

Various variation manners and specific instances in the information transmission method in the foregoing embodiment in FIG. 1 are also applicable to the base station in this embodiment. With the foregoing detailed descriptions of the information transmission method, a person skilled in the art may clearly know an implementation method of the base station in this embodiment. Therefore, for simplicity of this specification, details are not described herein.

Embodiment 3

Figure 11:
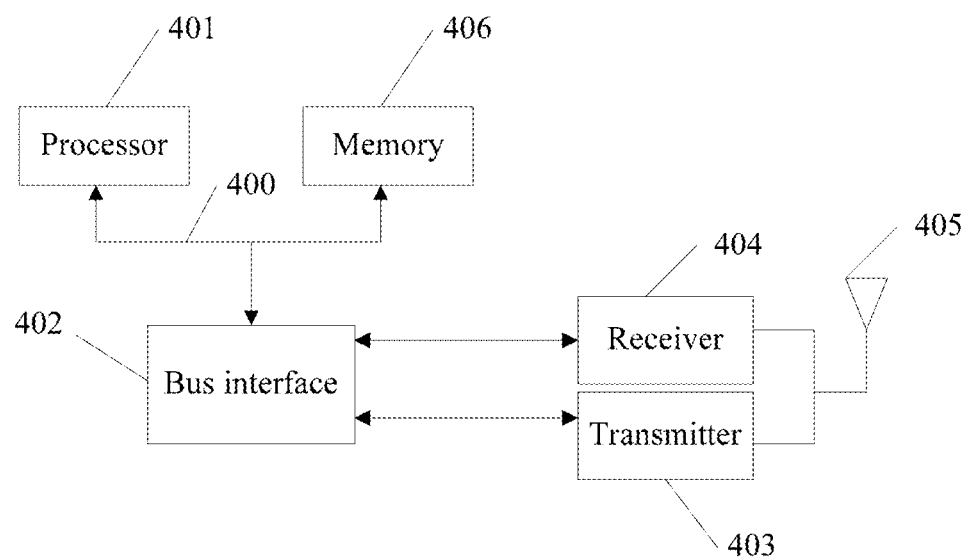
FIG. 11 is a conceptual instance diagram of hardware implementation of a base station according to Embodiment 3 of this application.

In this embodiment, a base station is further provided. Referring to FIG. 11, FIG. 11 is an exemplary conceptual diagram of hardware implementation of the base station. The base station includes: a processor 401, configured to determine a first frequency resource and a second frequency resource, where the first frequency resource is a frequency resource used to send first information in an enhanced manner, and the second frequency resource is a frequency resource used to send second information or send second information in an enhanced manner; and a transmitter 403, configured to: when there is an overlapping frequency resource between the first frequency resource and the second frequency resource, send, in an available subframe for sending the first information in an enhanced manner, the first information in an enhanced manner by using the first frequency resource, where the available subframe is one or more subframes other than a subframe in a subframe set for sending the second information or sending the second information in an enhanced manner; or send, in a subframe in a subframe set for sending the second information or sending the second information in an enhanced manner, the first information in an enhanced manner on a frequency resource other than the overlapping frequency resource in the first frequency resource.

In FIG. 11, a bus architecture is represented by a bus 400. The bus 400 may include any quantity of interconnected buses and bridges. The bus 400 links various circuits that include one or more processors 401 represented by the processor 401 and a memory represented by a memory 406, and the bus 400 may further link various other circuits such as a peripheral device, a voltage regulator, and a power management circuit, which are well known in the art, and therefore is not further described in this specification. A bus interface 402 provides interfaces between the bus 400 and a receiver 404 and/or between the bus 400 and the transmitter 403. The receiver 404 and the transmitter 403 may be a same component, that is, a transceiver, and the transceiver provides a unit configured to communicate with various other apparatuses on a transmission medium. Data processed by the processor 401 is transmitted on a wireless medium by using an antenna 405, and the antenna 405 further receives data and transfers the data to the processor 401.

The receiver 404 further receives data by using the antenna 405, and processes the data to restore information to be modulated onto a carrier. The information restored by the receiver 404 is provided for a receiving processor, the receiving processor parses each frame, and the receiving processor decodes the frame, and provides a successfully decoded control signal for the processor 401. If some frames cannot be successfully decoded by the receiving processor, the processor 401 may further support a retransmission request for those frames by using an ACK and/or NACK protocol.

The processor 401 is responsible for management of the bus 400 and general processing, and may further provide various functions, including timing, a peripheral interface, voltage adjustment, power supply management, and another control function. The memory 406 may be configured to store data used when the processor 401 performs an operation.

Further, the transmitter 403 is specifically configured to send, in the subframe in the subframe set for sending the second information or sending the second information in an enhanced manner, the first information in an enhanced manner on an available physical resource block PRB for the first information, where the available PRB for the first information is specifically a PRB, other than a PRB on which the overlapping frequency resource is located, in PRBs on which the first frequency resource is located.

Still further, in an embodiment, the transmitter 403 is specifically configured to: determine, according to a quantity of PRBs on which the first frequency resource is located, a quantity of all available bits for one transport block of the first information; select a sending bit of the transport block of the first information according to the quantity of all available bits; and map a modulation symbol of the first information to a resource element RE included in the PRB on which the first frequency resource is located, and when a first RE in the RE is included in the PRB on which the overlapping frequency resource is located, discard a modulation symbol corresponding to the first RE.

Still further, in another embodiment, the transmitter 403 is specifically configured to: determine, according to a quantity of available PRBs for the first information, a quantity of all available bits for one transport block of the first information; select a sending bit of the transport block of the first information according to the quantity of all available bits; and map a modulation symbol of the first information to a resource element RE included in the available PRB for the first information.

Further, in the subframe in the subframe set for sending the second information or sending the second information in an enhanced manner, at least one subframe is a subframe within duration for sending the first information in an enhanced manner, and the duration is a period for sending the first information in an enhanced manner or duration between a start subframe for sending the first information in an enhanced manner and an end subframe for sending the first information in an enhanced manner.

With reference to the foregoing embodiments, the first information is specifically at least one of unicast data, a system information block, or a random access response RAR, and the second information is specifically a master information block.

Further, the subframe set for sending the second information or sending the second information in an enhanced manner includes subframes, whose numbers are the same as that of a subframe for sending the second information or sending the second information in an enhanced manner, in all radio frames; or the subframe set for sending the second information or sending the second information in an enhanced manner includes a subframe for sending the second information or sending the second information in an enhanced manner.

In another embodiment, the first information is specifically a random access response RAR, and the second information is specifically a system information block; or the first information is specifically a paging message, and the second information is specifically a system information block and/or a random access response RAR; or the first information is specifically unicast data, and the second information is specifically at least one of a system information block, a random access response RAR, or a paging message; or the first information is specifically first unicast data, and the second information is specifically second unicast data, where the first unicast data and the second unicast data are different unicast data.

With reference to the foregoing embodiments, when the first information or the second information is another system information block than a type-1 system information block, the transmitter 403 is further configured to send or send, in an enhanced manner, the type-1 system information block, where the type-1 system information block includes configuration information of the first frequency resource or the second frequency resource.

Various variation manners and specific instances in the information transmission method in the foregoing embodiment in FIG. 1 are also applicable to the base station in this embodiment. With the foregoing detailed descriptions of the information transmission method, a person skilled in the art may clearly know an implementation method of the base station in this embodiment. Therefore, for simplicity of this specification, details are not described herein.

Embodiment 4

Figure 12:
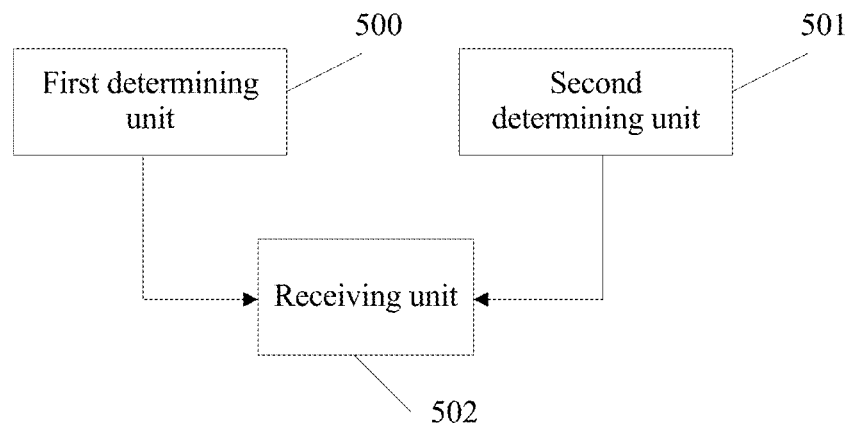
FIG. 12 is a functional block diagram of user equipment according to Embodiment 4 of this application.

In this embodiment, user equipment is provided. Referring to FIG. 12, FIG. 12 is a functional block diagram of the user equipment. The user equipment includes: a first determining unit 500, configured to determine a first frequency resource, where the first frequency resource is a frequency resource used to send first information in an enhanced manner; a second determining unit 501, configured to determine a second frequency resource, where the second frequency resource is a frequency resource used to send second information or send second information in an enhanced manner; and a receiving unit 502, configured to: when there is an overlapping frequency resource between the first frequency resource and the second frequency resource, receive, in an available subframe for sending the first information in an enhanced manner, the first information in an enhanced manner on the first frequency resource, where the available subframe is one or more subframes other than a subframe in a subframe set for sending the second information or sending the second information in an enhanced manner; or receive, in a subframe in a subframe set for sending the second information or sending the second information in an enhanced manner, the first information in an enhanced manner on a frequency resource other than the overlapping frequency resource in the first frequency resource.

Further, the receiving unit 502 is specifically configured to receive, in the subframe in the subframe set for sending the second information or sending the second information in an enhanced manner, the first information in an enhanced manner on an available physical resource block PRB for the first information, where the available PRB for the first information is specifically a PRB, other than a PRB on which the overlapping frequency resource is located, in PRBs on which the first frequency resource is located.

Further, in the subframe in the subframe set for sending the second information or sending the second information in an enhanced manner, at least one subframe is a subframe within duration for sending the first information in an enhanced manner, and the duration is a period for sending the first information in an enhanced manner or duration between a start subframe for sending the first information in an enhanced manner and an end subframe for sending the first information in an enhanced manner.

With reference to the foregoing embodiments, the first information is specifically at least one of unicast data, a system information block, or a random access response RAR, and the second information is specifically a master information block.

Further, the subframe set for sending the second information or sending the second information in an enhanced manner includes subframes, whose numbers are the same as that of a subframe for sending the second information or sending the second information in an enhanced manner, in all radio frames; or the subframe set for sending the second information or sending the second information in an enhanced manner includes a subframe for sending the second information or sending the second information in an enhanced manner.

In another embodiment, the first information is specifically a random access response RAR, and the second information is specifically a system information block; or the first information is specifically a paging message, and the second information is specifically a system information block and/or a random access response RAR; or the first information is specifically unicast data, and the second information is specifically at least one of a system information block, a random access response RAR, or a paging message; or the first information is specifically first unicast data, and the second information is specifically second unicast data, where the first unicast data and the second unicast data are different unicast data.

With reference to the foregoing embodiments, when the first information or the second information is another system information block than a type-1 system information block, the receiving unit 502 is further configured to receive or receive, in an enhanced manner, the type-1 system information block; and the first determining unit 500 or the second determining unit 501 is specifically configured to determine the first frequency resource or the second frequency resource according to configuration information included in the type-1 system information block that is received by the receiving unit 502.

Various variation manners and specific instances in the information transmission method in the foregoing embodiment in FIG. 9 are also applicable to the user equipment in this embodiment. With the foregoing detailed descriptions of the information transmission method, a person skilled in the art may clearly know an implementation method of the user equipment in this embodiment. Therefore, for simplicity of this specification, details are not described herein.

Embodiment 5

Figure 13:
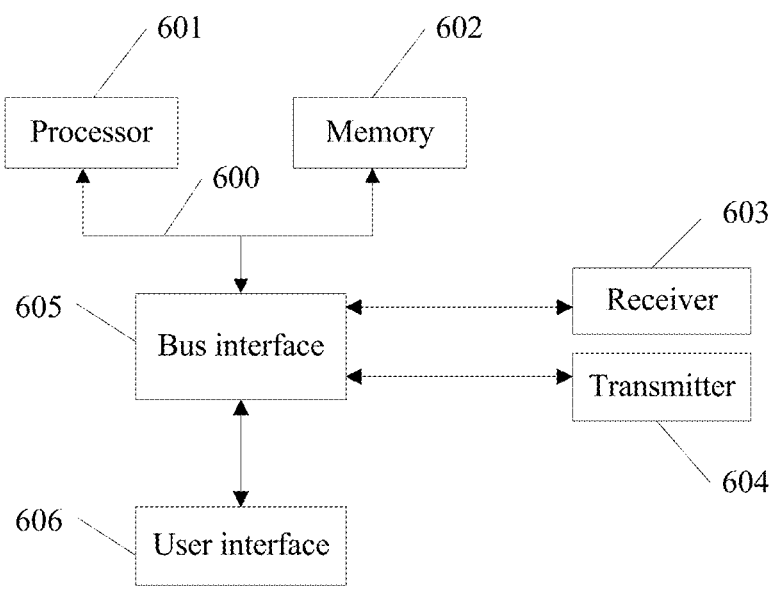
FIG. 13 is a conceptual instance diagram of hardware implementation of user equipment according to Embodiment 5 of this application.

In this embodiment, user equipment is provided. Referring to FIG. 13, FIG. 13 is an exemplary block diagram of hardware implementation of the user equipment. The user equipment includes: a processor 601, configured to determine a first frequency resource and a second frequency resource, where the first frequency resource is a frequency resource used to send first information in an enhanced manner, and the second frequency resource is a frequency resource used to send second information or send second information in an enhanced manner; and a receiver 603, configured to: when there is an overlapping frequency resource between the first frequency resource and the second frequency resource, receive, in an available subframe for sending the first information in an enhanced manner, the first information in an enhanced manner on the first frequency resource, where the available subframe is one or more subframes other than a subframe in a subframe set for sending the second information or sending the second information in an enhanced manner; or receive, in a subframe in a subframe set for sending the second information or sending the second information in an enhanced manner, the first information in an enhanced manner on a frequency resource other than the overlapping frequency resource in the first frequency resource.

In FIG. 13, a bus architecture is represented by a bus 600. The bus 600 may include any quantity of interconnected buses and bridges. The bus 600 links various circuits that include one or more processors represented by the processor 601 and a memory represented by a memory 602, and the bus 600 may further link various other circuits such as a peripheral device, a voltage regulator, and a power management circuit, which are well known in the art, and therefore is not further described in this specification. A bus interface 605 provides interfaces between the bus 600 and the receiver 603 and between the bus 600 and a transmitter 604. The receiver 603 and the transmitter 604 may be a same component, that is, a transceiver, and the transceiver provides a unit configured to communicate with various other apparatuses on a transmission medium. Depending on an attribute of the user equipment, a user interface 606 such as a keypad, a display, a speaker, a microphone, or a joystick may be further provided.

The processor 601 is responsible for management of the bus 600 and general processing, and the memory 602 may be configured to store data used when the processor 601 performs an operation.

Further, the receiver 603 is specifically configured to receive, in the subframe in the subframe set for sending the second information or sending the second information in an enhanced manner, the first information in an enhanced manner on an available physical resource block PRB for the first information, where the available PRB for the first information is specifically a PRB, other than a PRB on which the overlapping frequency resource is located, in PRBs on which the first frequency resource is located.

Further, in the subframe in the subframe set for sending the second information or sending the second information in an enhanced manner, at least one subframe is a subframe within duration for sending the first information in an enhanced manner, and the duration is a period for sending the first information in an enhanced manner or duration between a start subframe for sending the first information in an enhanced manner and an end subframe for sending the first information in an enhanced manner.

With reference to the foregoing embodiments, the first information is specifically at least one of unicast data, a system information block, or a random access response RAR, and the second information is specifically a master information block.

Further, the subframe set for sending the second information or sending the second information in an enhanced manner includes subframes, whose numbers are the same as that of a subframe for sending the second information or sending the second information in an enhanced manner, in all radio frames; or the subframe set for sending the second information or sending the second information in an enhanced manner includes a subframe for sending the second information or sending the second information in an enhanced manner.

In another embodiment, the first information is specifically a random access response RAR, and the second information is specifically a system information block; or the first information is specifically a paging message, and the second information is specifically a system information block and/or a random access response RAR; or the first information is specifically unicast data, and the second information is specifically at least one of a system information block, a random access response RAR, or a paging message; or the first information is specifically first unicast data, and the second information is specifically second unicast data, where the first unicast data and the second unicast data are different unicast data.

With reference to the foregoing embodiments, when the first information or the second information is another system information block than a type-1 system information block, the receiver 603 is further configured to receive or receive, in an enhanced manner, the type-1 system information block; and the processor 601 is specifically configured to determine the first frequency resource or the second frequency resource according to configuration information included in the type-1 system information block that is received by the receiver 603.

Various variation manners and specific instances in the information transmission method in the foregoing embodiment in FIG. 9 are also applicable to the user equipment in this embodiment. With the foregoing detailed descriptions of the information transmission method, a person skilled in the art may clearly know an implementation method of the user equipment in this embodiment. Therefore, for simplicity of this specification, details are not described herein.

One or more technical solutions provided in the embodiments of this application have at least the following technical effects or advantages:

According to an information transmission method in the embodiments of this application, a first frequency resource is determined, where the first frequency resource is a frequency resource used to send first information in an enhanced manner; a second frequency resource is determined, where the second frequency resource is a frequency resource used to send second information or send second information in an enhanced manner; and when there is an overlapping frequency resource between the first frequency resource and the second frequency resource, in an available subframe for sending the first information in an enhanced manner, the first information is sent in an enhanced manner by using the first frequency resource, where the available subframe for sending the first information in an enhanced manner is one or more subframes other than a subframe in a subframe set for sending the second information or sending the second information in an enhanced manner; or in a subframe in a subframe set for sending the second information or sending the second information in an enhanced manner, the first information is sent in an enhanced manner on a frequency resource other than the overlapping frequency resource in the first frequency resource. Therefore, the embodiments provide two effective methods for avoiding a conflict when there is an overlapping frequency resource between frequency resources for enhanced sending of different information or between frequency resources for enhanced sending of different information and sending of different information.

A person skilled in the art should understand that the embodiments of this application may be provided as a method, a system, or a computer program product. Therefore, this application may use a form of hardware only embodiments, software only embodiments, or embodiments with a combination of software and hardware. Moreover, the present invention may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An information transmission method, comprising:
   determining a first frequency resource, wherein the first frequency resource is a frequency resource used to send first information in an enhanced manner;
   determining a second frequency resource, wherein the second frequency resource is a frequency resource used to send second information or send second information in an enhanced manner; and
   when there is an overlapping frequency resource between the first frequency resource and the second frequency resource,
   sending, in an available subframe for sending the first information in an enhanced manner, the first information in an enhanced manner by using the first frequency resource, wherein the available subframe is one or more subframes other than a subframe in a subframe set for sending the second information or sending the second information in an enhanced manner; or
   sending, in a subframe in a subframe set for sending the second information or sending the second information in an enhanced manner, the first information in an enhanced manner on a frequency resource other than the overlapping frequency resource in the first frequency resource;
   wherein:
   the first information is specifically a random access response (RAR), and the second information is specifically a system information block; or
   the first information is a paging message, and the second information is a system information block; or
   the first information is specifically unicast data, and the second information is a system information block.

2. The method according to claim 1, wherein the sending, in a subframe in a subframe set for sending the second information or sending the second information in an enhanced manner, the first information in an enhanced manner on a frequency resource other than the overlapping frequency resource in the first frequency resource comprises:
   sending, in the subframe in the subframe set for sending the second information or sending the second information in an enhanced manner, the first information in an enhanced manner on an available physical resource block (PRB) for the first information, wherein the available PRB for the first information is specifically a PRB, other than a PRB on which the overlapping frequency resource is located, in PRBs on which the first frequency resource is located.

3. The method according to claim 1, wherein in the subframe in the subframe set for sending the second information or sending the second information in an enhanced manner, at least one subframe is a subframe within duration for sending the first information in an enhanced manner, and the duration is a period for sending the first information in an enhanced manner or duration between a start subframe for sending the first information in an enhanced manner and an end subframe for sending the first information in an enhanced manner.

4. The method according to claim 1, wherein the subframe set for sending the second information or sending the second information in an enhanced manner comprises subframes, whose numbers are the same as that of a subframe for sending the second information or sending the second information, in all radio frames; or the subframe set for sending the second information or sending the second information in an enhanced manner comprises a subframe for sending the second information or sending the second information in an enhanced manner.

5. The method according to claim 1, wherein when the first information or the second information is another system information block than a type-1 system information block, the method further comprises:
sending, or sending in an enhanced manner, the type-1 system information block, wherein the type-1 system information block comprises configuration information of the first frequency resource or the second frequency resource.

6. The method according to claim 1, wherein sending the first information or the second information in the enhanced manner comprises sending the first information or the second information repeatedly.

7. An information transmission method, comprising:
determining a first frequency resource, wherein the first frequency resource is a frequency resource used to send first information in an enhanced manner;
determining a second frequency resource, wherein the second frequency resource is a frequency resource used to send second information or send second information in an enhanced manner; and
when there is an overlapping frequency resource between the first frequency resource and the second frequency resource,
receiving, in an available subframe for sending the first information in an enhanced manner, the first information in an enhanced manner on the first frequency resource, wherein the available subframe is one or more subframes other than a subframe in a subframe set for sending the second information or sending the second information in an enhanced manner; or
receiving, in a subframe in a subframe set for sending the second information or sending the second information in an enhanced manner, the first information in an enhanced manner on a frequency resource other than the overlapping frequency resource in the first frequency resource;
wherein:
the first information is specifically a random access response (RAR), and the second information is specifically a system information block; or
the first information is a paging message, and the second information is a system information block; or
the first information is specifically unicast data, and the second information is a system information block.

8. The method according to claim 7, wherein the receiving, in a subframe in a subframe set for sending the second information or sending the second information in an enhanced manner, the first information in an enhanced manner on a frequency resource other than the overlapping frequency resource in the first frequency resource comprises:
receiving, in the subframe in the subframe set for sending the second information or sending the second information in an enhanced manner, the first information in an enhanced manner on an available physical resource block (PRB) for the first information, wherein the available PRB for the first information is specifically a PRB, other than a PRB on which the overlapping frequency resource is located, in PRBs on which the first frequency resource is located.

9. The method according to claim 7, wherein in the subframe in the subframe set for sending the second information or sending the second information in an enhanced manner, at least one subframe is a subframe within duration for sending the first information in an enhanced manner, and the duration is a period for sending the first information in an enhanced manner or duration between a start subframe for sending the first information in an enhanced manner and an end subframe for sending the first information in an enhanced manner.

10. The method according to claim 7, wherein the subframe set for sending the second information or sending the second information in an enhanced manner comprises subframes, whose numbers are the same as that of a subframe for sending the second information or sending the second information in an enhanced manner, in all radio frames; or the subframe set for sending the second information or sending the second information in an enhanced manner comprises a subframe for sending the second information or sending the second information in an enhanced manner.

11. The method according to claim 7, wherein when the first information or the second information is another system information block than a type-1 system information block, the method further comprises:
receiving, or receiving in an enhanced manner, the type-1 system information block; and
the determining a first frequency resource or the determining a second frequency resource is specifically:
determining the first frequency resource or the second frequency resource according to configuration information comprised in the type-1 system information block.

12. The method according to claim 7, wherein receiving the first information or the second information in the enhanced manner comprises receiving the first information or the second information repeatedly.

13. User equipment, comprising:
a processor, configured to determine a first frequency resource and a second frequency resource, wherein the first frequency resource is a frequency resource used to send first information in an enhanced manner, and the second frequency resource is a frequency resource used to send second information or send second information in an enhanced manner; and
a receiver, configured to: when there is an overlapping frequency resource between the first frequency resource and the second frequency resource,
receive, in an available subframe for sending the first information in an enhanced manner, the first information in an enhanced manner on the first frequency resource, wherein the available subframe is one or more subframes other than a subframe in a subframe set for sending the second information or sending the second information in an enhanced manner; or
receive, in a subframe in a subframe set for sending the second information or sending the second information in an enhanced manner, the first information in an enhanced manner on a frequency resource other than the overlapping frequency resource in the first frequency resource;
wherein:

the first information is a random access response (RAR), and the second information is specifically a system information block; or the first information is a paging message, and the second information is a system information block; or the first information is specifically unicast data, and the second information is a system information block.

14. The user equipment according to claim 13, wherein the receiver is specifically configured to receive, in the subframe in the subframe set for sending the second information or sending the second information in an enhanced manner, the first information in an enhanced manner on an available physical resource block (PRB) for the first information, wherein the available PRB for the first information is specifically a PRB, other than a PRB on which the overlapping frequency resource is located, in PRBs on which the first frequency resource is located.

15. The user equipment according to claim 13, wherein in the subframe in the subframe set for sending the second information or sending the second information in an enhanced manner, at least one subframe is a subframe within duration for sending the first information in an enhanced manner, and the duration is a period for sending the first information in an enhanced manner or duration between a start subframe for sending the first information in an enhanced manner and an end subframe for sending the first information in an enhanced manner.

16. The user equipment according to claim 13, wherein the subframe set for sending the second information or sending the second information in an enhanced manner comprises subframes, whose numbers are the same as that of a subframe for sending the second information or sending the second information in an enhanced manner, in all radio frames; or the subframe set for sending the second information or sending the second information in an enhanced manner comprises a subframe for sending the second information or sending the second information in an enhanced manner.

17. The user equipment according to claim 13, wherein when the first information or the second information is another system information block than a type-1 system information block, the receiver is further configured to:

receive, or receive in an enhanced manner, the type-1 system information block; and the processor is configured to determine a first frequency resource or the determining a second frequency resource is specifically configured to:

determine the first frequency resource or the second frequency resource according to configuration information comprised in the type-1 system information block.

18. The user equipment according to claim 13, wherein receiving the first information or the second information in the enhanced manner comprises receiving the first information or the second information repeatedly.

19. A base station, comprising:

a processor, configured to determine a first frequency resource and a second frequency resource, wherein the first frequency resource is a frequency resource used to send first information in an enhanced manner, and the second frequency resource is a frequency resource used to send second information or send second information in an enhanced manner; and a transmitter, configured to: when there is an overlapping frequency resource between the first frequency resource and the second frequency resource, send, in an available subframe for sending the first information in an enhanced manner, the first information in an enhanced manner by using the first frequency resource, wherein the available subframe is one or more subframes other than a subframe in a subframe set for sending the second information or sending the second information in an enhanced manner; or send, in a subframe in a subframe set for sending the second information or sending the second information in an enhanced manner, the first information in an enhanced manner on a frequency resource other than the overlapping frequency resource in the first frequency resource;

wherein:

the first information is specifically a random access response (RAR), and the second information is specifically a system information block; or the first information is a paging message, and the second information is a system information block; or the first information is unicast data, and the second information is a system information block.

20. The base station according to claim 19, wherein the transmitter is specifically configured to send, in the subframe in the subframe set for sending the second information or sending the second information in an enhanced manner, the first information in an enhanced manner on an available physical resource block PRB for the first information, wherein the available PRB for the first information is specifically a PRB, other than a PRB on which the overlapping frequency resource is located, in PRBs on which the first frequency resource is located.

21. The base station according to claim 19, wherein in the subframe in the subframe set for sending the second information or sending the second information in an enhanced manner, at least one subframe is a subframe within duration for sending the first information in an enhanced manner, and the duration is a period for sending the first information in an enhanced manner or duration between a start subframe for sending the first information in an enhanced manner and an end subframe for sending the first information in an enhanced manner.

22. The base station according to claim 19, wherein the subframe set for sending the second information or sending the second information in an enhanced manner comprises subframes, whose numbers are the same as that of a subframe for sending the second information or sending the second information in an enhanced manner, in all radio frames; or the subframe set for sending the second information or sending the second information in an enhanced manner comprises a subframe for sending the second information or sending the second information in an enhanced manner.

23. The base station according to claim 19, wherein when the first information or the second information is another system information block than a type-1 system information block, the transmitter is further configured to:

send, or send in an enhanced manner, the type-1 system information block, wherein the type-1 system information block comprises configuration information of the first frequency resource or the second frequency resource.

24. The base station according to claim 19, wherein sending the first information or the second information in the enhanced manner comprises sending the first information or the second information repeatedly.

* * * * *

UNITED STATES PATENT AND TRADEMARK OFFICE
CERTIFICATE OF CORRECTION

PATENT NO. : 10,700,815 B2
APPLICATION NO. : 15/256151
DATED : June 30, 2020
INVENTOR(S) : Nan et al.

Page 1 of 1

It is certified that error appears in the above-identified patent and that said Letters Patent is hereby corrected as shown below:

In the Claims

Claim 13: Column 45, Line 1: "the first information is a random access response (RAR)," should read -- the first information is specifically a random access response (RAR), --.

Claim 19: Column 46, Line 20: "the first information is unicast data, and the second" should read -- the first information is specifically unicast data, and the second --.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*